US009959599B2

(12) United States Patent
Choudhury et al.

(10) Patent No.: US 9,959,599 B2
(45) Date of Patent: May 1, 2018

(54) SYSTEM FOR ENHANCED IMAGES

(71) Applicant: Sharp Laboratories of America, Inc., Camas, WA (US)

(72) Inventors: Anustup Kumar A. Choudhury, Vancouver, WA (US); Christopher Andrew Segall, Vancouver, WA (US); Mark DeNies, Lake Oswego, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days. days.

(21) Appl. No.: 14/743,903

(22) Filed: Jun. 18, 2015

(65) Prior Publication Data
US 2016/0371816 A1    Dec. 22, 2016

(51) Int. Cl.
| *G06K 9/40* | (2006.01) |
| *G06T 5/00* | (2006.01) |
| *G06T 5/20* | (2006.01) |
| *G06T 5/50* | (2006.01) |
| *H04N 1/60* | (2006.01) |
| *G06T 7/215* | (2017.01) |

(52) U.S. Cl.
CPC ............... *G06T 5/002* (2013.01); *G06T 5/20* (2013.01); *G06T 5/50* (2013.01); *G06T 7/215* (2017.01); *H04N 1/60* (2013.01); *G06T 2207/10016* (2013.01); *G06T 2207/10024* (2013.01); *G06T 2207/20024* (2013.01); *G06T 2207/20182* (2013.01)

(58) Field of Classification Search
USPC ....... 382/254, 260, 274, 275, 107, 167, 190, 382/232; 348/441, 448, 180, 618, 620, 348/E17.001; 356/477; 375/240.03, 375/240.12
See application file for complete search history.

(56) References Cited

U.S. PATENT DOCUMENTS

| 7,663,701 | B2 * | 2/2010 | de Garrido | ............ H04N 5/144 348/618 |
| 7,805,011 | B2 * | 9/2010 | Klamer | ................ G11B 27/031 382/190 |

(Continued)

OTHER PUBLICATIONS

B. Bross et al., "High efficiency video coding (HEVC) text specification draft 8," JCTVC-J1003, 10th Meeting, Stockholm, SE, Jul. 11-20, 2012, 50 pgs., Part 1.

(Continued)

*Primary Examiner* — Anh H Do
(74) *Attorney, Agent, or Firm* — ScienBiziP, P.C.; Steve Reiss

(57) ABSTRACT

A system for enhancing an image includes a cadence detection process that detects a cadence of a series of frames, a scene cut detection process that detects a scene cut of the series of frames, and a noise monitoring process that detects noise in the series of frames based upon the cadence detection process. The system also includes a temporal filtering process temporally filtering the series of frames wherein the temporal filtering is modified based upon the scene cut detection process and the noise monitoring process, and a spatial noise reduction process reducing spatial noise in the series of frames wherein the reducing spatial noise is modified based upon the modified temporally filtered frames and the noise monitoring process.

22 Claims, 32 Drawing Sheets

(56) References Cited

U.S. PATENT DOCUMENTS

| | | | | |
|---|---|---|---|---|
| 7,933,328 B2* | 4/2011 | Degarrido | ............... | H04N 5/147 |
| | | | | 375/240.03 |
| 8,134,640 B2* | 3/2012 | Doswald | ............... | H04N 7/0112 |
| | | | | 348/441 |
| 8,693,735 B2* | 4/2014 | Kielkopf | ................ | G01B 11/00 |
| | | | | 356/477 |

OTHER PUBLICATIONS

B. Bross et al., "High efficiency video coding (HEVC) text specification draft 8," JCTVC-J1003, 10th Meeting, Stockholm, SE, Jul. 11-20, 2012, 50 pgs., Part 2.
B. Bross et al., "High efficiency video coding (HEVC) text specification draft 8," JCTVC-J1003, 10th Meeting, Stockholm, SE, Jul. 11-20, 2012, 50 pgs., Part 3.
B. Bross et al., "High efficiency video coding (HEVC) text specification draft 8," JCTVC-J1003, 10th Meeting, Stockholm, SE, Jul. 11-20, 2012, 50 pgs., Part 4.
B. Bross et al., "High efficiency video coding (HEVC) text specification draft 8," JCTVC-J1003, 10th Meeting, Stockholm, SE, Jul. 11-20, 2012, 50 pgs., Part 5.
B. Bross et al., "High efficiency video coding (HEVC) text specification draft 8," JCTVC-J1003, 10th Meeting, Stockholm, SE, Jul. 11-20, 2012, 10 pgs., Part 6.

* cited by examiner

| Gain calculated from variance with a maximum of 1024 | Threshold Time 32 | Scale Times 32 | Abs(mean difference) | Adjusted Gain |
|---|---|---|---|---|
| 512 | 128 | 128 | <=128 | 512 |
| 512 | 128 | 128 | 256 | 768 |
| 512 | 128 | 128 | 384 | 853 |
| 768 | 128 | 128 | 256 | 896 |
| 768 | 128 | 128 | 384 | 939 |
| 512 | 128 | 64 | 256 | 896 |
| 512 | 128 | 64 | 384 | 939 |
| 768 | 128 | 64 | 256 | 960 |
| 768 | 128 | 64 | 384 | 981 |

FIG. 27

SYSTEM FOR ENHANCED IMAGES

CROSS-REFERENCE TO RELATED APPLICATIONS

None.

BACKGROUND OF THE INVENTION

Image enhancement processing generally refers to techniques that enhance an image or a video. Image enhancement in image and video technology enables an improvement of a low resolution image or a low resolution video to, respectively, an enhanced image or an enhanced video. By way of example, a television may use an enhancement technique to modify a standard definition video sequence to an enhanced video sequence. Similarly, an image or video taken with a low resolution imaging device, such as a mobile phone, may be an enhanced image or video, respectively. In addition, the enhancement technique may include noise reduction.

Many enhancement techniques use two processing stages. The first stage includes multiple low-resolution images being registered with an image processing system, where one of the low-resolution images is selected as a primary image, and horizontal and vertical displacements of the rest of the low-resolution images (i.e., secondary images) are computed with respect to the primary image. The second stage includes the registered images being combined together to create an enhanced resolution image using the displacement information and aliasing information present in the low resolution images. This technique may be extended to a series of images of a video sequence for a video. Unfortunately, the resulting video sequence tends to have artifacts from the various components of the enhancement technique.

The foregoing and other objectives, features, and advantages of the invention may be more readily understood upon consideration of the following detailed description of the invention, taken in conjunction with the accompanying drawings.

BRIEF DESCRIPTION OF THE SEVERAL VIEWS OF THE DRAWINGS

FIG. 27 illustrates a table for modified compression identification.

DETAILED DESCRIPTION OF PREFERRED EMBODIMENT

Figure 1:
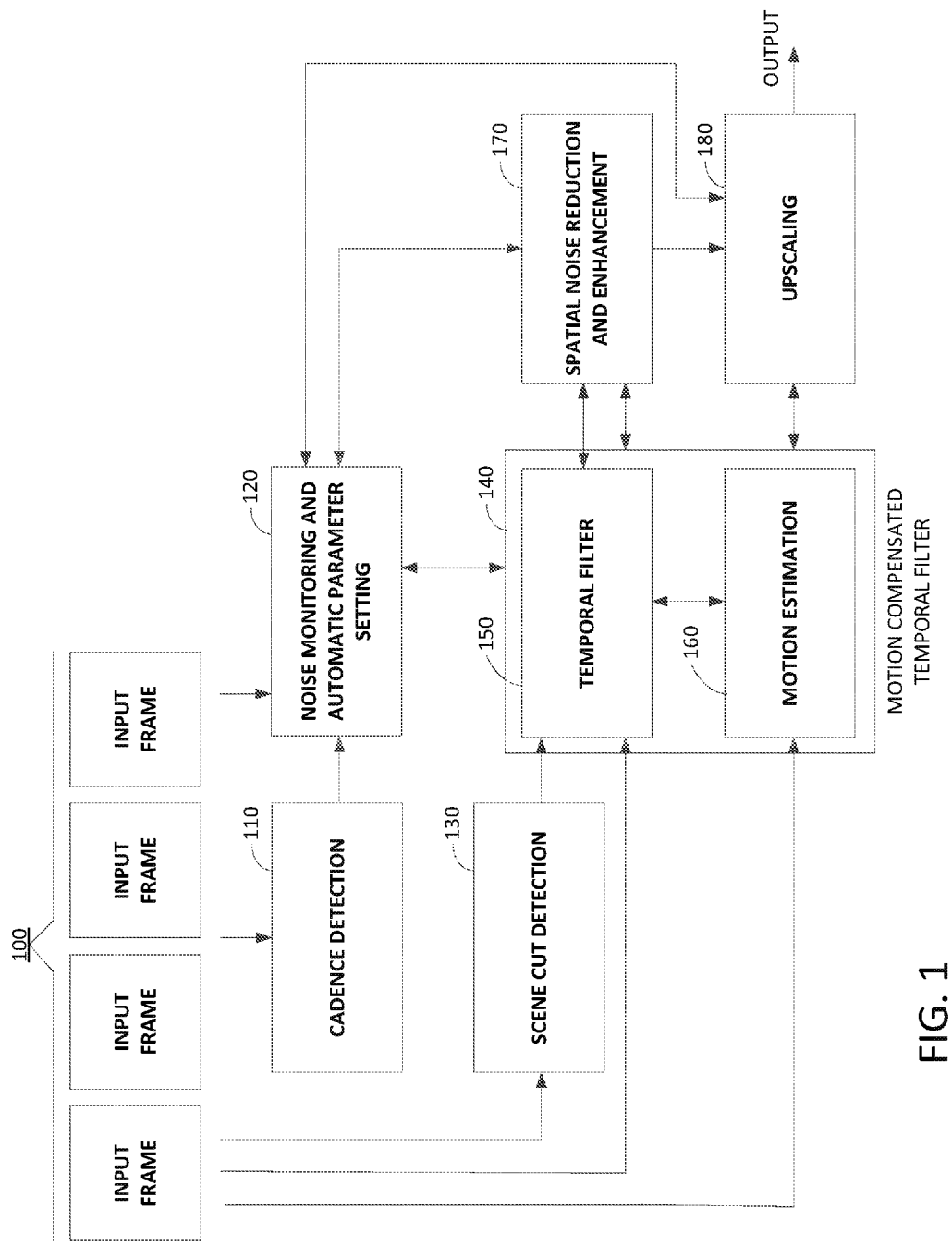
FIG. 1 illustrates a technique to enhance frames of a video.

Referring to FIG. 1, a video system may enhance a video that it receives as a series of low resolution input frames 100. The series of input frames 100 represents one or more scenes of a video sequence, each temporally the same and/or different from each other. The video system may include a cadence detection 110. Cadence detection refers to determining whether a pattern is present in a sequence of frames of the video. Often video has a sequence of frames because most films and television is captured at 24 frames per second. For video content conforming to the NTSC standard, the video needs to be presented at 60 frames/fields per second. For video content being presented at other resolutions, such as 1080i60 (1920×1080 video at 60 fields per second) or 720p60 (1280×720 video at 60 progressive frames per second) the content needs to be presented at 60 frames/fields per second. To achieve this conversion, the frame rate is increased or otherwise modified by duplicating and/or interpolating frames/fields in a regular patter. In some cases, the process involves converting progressive content to interlaced content and also increasing the frame rate. Knowledge of the cadence of the video sequence provides information that may be used to improve the quality of the increased resolution. For example, the original frames may be considered to have the best quality, while the copy frames do not carry any additional information, and interpolated frames may in general be considered of low quality depending on the quality of the interpolation technique.

For example some cadences that may be detected are 1:1 (where every frame is unique); 2:2 (where a unique frame is followed by a copy frame); 3:2 (where a unique frame is followed by 2 copy frames and the next unique frame is followed by 1 copy frame); 4:4 (where a unique frame is followed by 3 copy frames); 5:5 (where a unique frame is followed by 4 copy frames); and 6:4 (where a unique frame is followed by 5 copy frames and the next unique frame is followed by 3 copy frames). Other variations of the cadence may include, for example, 2:1:1:1 (where a unique frame is followed by a copy frame and an interpolated frame, respectively, and the next unique frame is followed by a copy frame); 3:1:3:1 (where a unique frame is followed by 2 copy frames and 1 interpolated frame); 4:1:4:1 (where a unique frame is followed by 3 copy frames and 1 interpolated frame); and 5:1:3:1 (where a unique frame is followed by 4 copy frames and 1 interpolated frame and the next unique frame is followed by 2 copy frames and 1 interpolated frame).

Figure 2A:
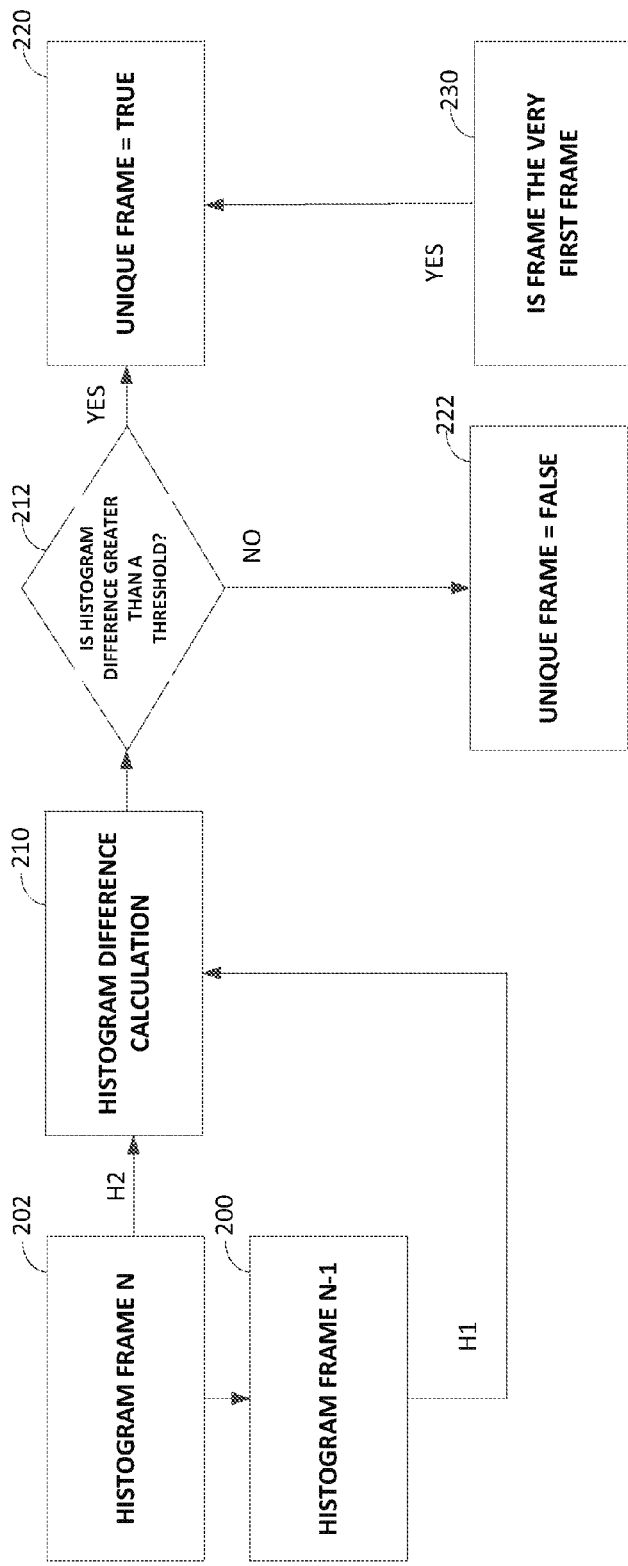
FIGS. 2A and 2B illustrate cadence detection processes.

Referring to FIG. 2A, the cadence detection 110 may take the form of predicting if an incoming frame is a unique or a copy frame. A histogram (or other statistical measure) is calculated for each frame of the video that is received. A buffer includes a histogram of the current frame N 202. The buffer also includes a histogram of the previous frame N−1 200. A histogram difference calculation 210 determines a difference between the histogram of the current frame 202 and the histogram of the previous frame 200. For example, the histogram difference may be $D(H1,H2)=\Sigma_{i=1}^{N}|H_1(i)-H_2(i)|$. Other measures may be used to calculate a comparison between a current frame and one or more other frames. If the difference between the histograms is greater than a threshold 212 then the system identifies the frame N as a unique frame 220. If the difference between the histograms is less or equal to a threshold 212 then the system identifies the frame N not as a unique frame 222. In addition, if the frame N is the first frame 230 then it is identified as a unique frame 220.

Figure 2B:
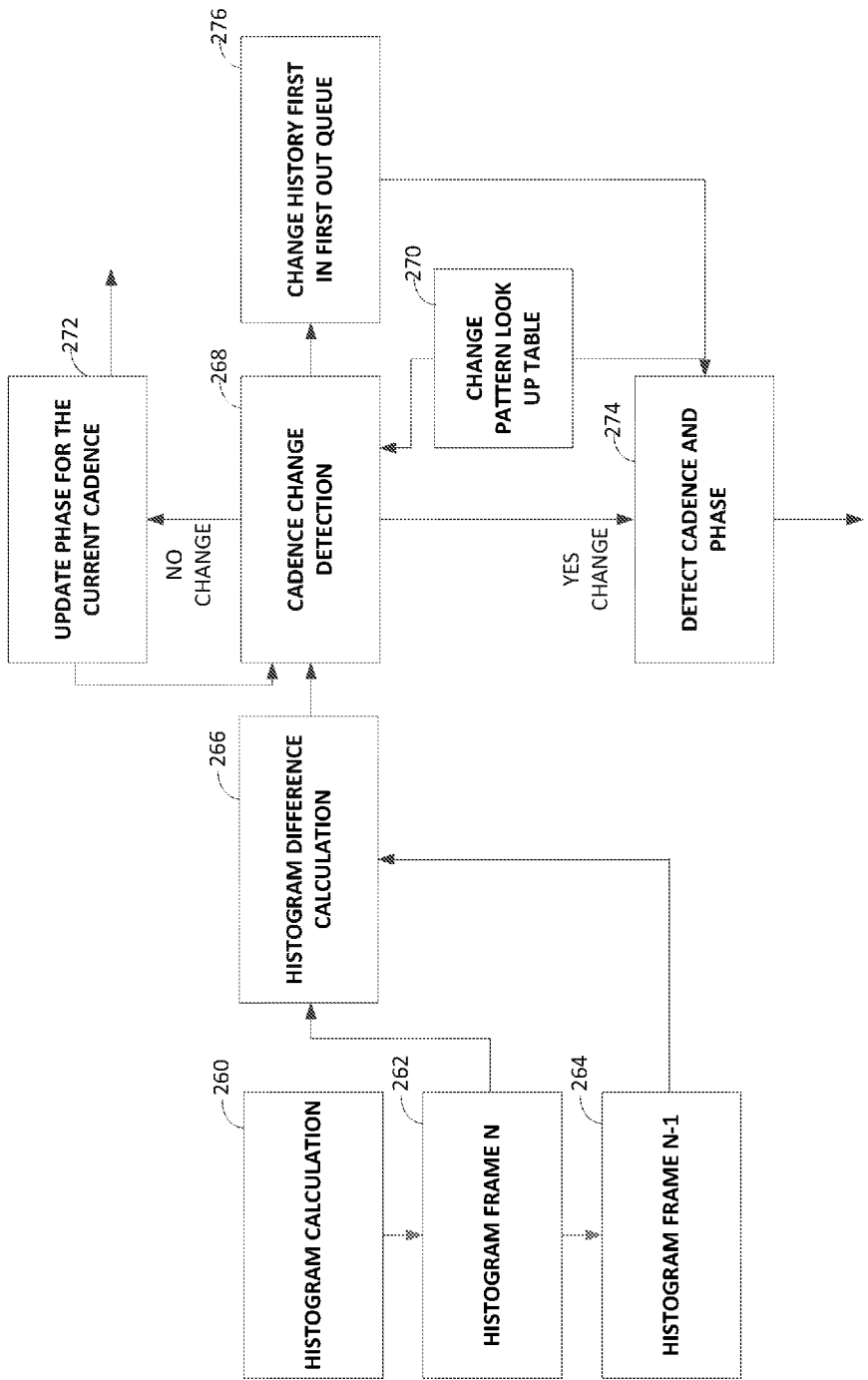

Referring to FIG. 2B, the cadence detection 110 process may be based upon processing the video content, including for example, whether the sequence uses only original and copy frames, and/or if the video sequence contains only original and interpolated frames. In general, the cadence detection 110 may determine which among a set of pre-defined cadence patterns are present to reduce the computational complexity of the system and reduce the likelihood of false positives. The cadence detection 110 process determines the cadence pattern and the position of each frame within the cadence (e.g., generally referred to as the phase).

The cadence detection 110 process may include two principal components. The first component is responsible for detecting and monitoring the phase of the video sequence. A histogram (or other statistical measure) is calculated 260 for each frame of the video that is received. A buffer includes a histogram of the current frame N 262. The buffer also includes a histogram of the previous frame N−1 264. A histogram difference calculation 266 determines a difference between the histogram of the current frame 262 and the histogram of the previous frame 264. Other measures may be used to calculate a comparison between a current frame and one or more other frames. A cadence change detection 268 maintains a knowledge of the current cadence of the frames and the anticipated state of the next frame in the current cadence, based upon a change pattern look up table 270. In this manner, the cadence change detection 268 compares the difference between different frames (e.g., consecutive frames) with a prediction of the difference based on the current cadence and phase. If the cadence change detection 268 determines that the current frame has the anticipated comparison (e.g., no change), the phase may be incremented 272 and the updated phase provided to the cadence change detection 268. In addition, the information related to the phase and cadence may be provided to other parts of the video system. If the cadence change detection 268 determines that the current frame does not have the anticipated comparison (e.g., yes change), a detect cadence and phase 274 process is used to determine an updated cadence and phase. The detect cadence and phase 274 compares a change history first in first out queue 276 of changes in the frame pattern to the change pattern look up table 270 to determine an updated cadence and phase. A default cadence may be used if a match by the detect cadence and phase 274 was not determined. The cadence detection 110 may be informed, if desired, in a suitable manner if the video sequence has interpolated frames and/or copied frames, which may be used as a basis upon which to determine the cadence and phase.

The detect cadence and phase 274 may provide information to a noise monitoring and automatic parameter setting 120 (or other parts of the video system, as desired). By way of example, the information may include the current cadence and/or phase which indicates the nature of the frame being processed by the noise monitoring and automatic parameter setting 120. The nature of the frame being processed may be, for example, an original frame, a copied frame, and/or an interpolated frame.

In the case that all of the frames are being interpolated, the cadence may indicate that all the frames are different, e.g., 1:1 cadence. In this case, a sum of absolute differences process, which may be calculated during a motion estimation process, may be used to distinguish the original frames from the interpolated frames. Other techniques may likewise be used to distinguish between original frames and interpolated frames. In the case of the sum of absolute differences, the interpolated frame typically has a smaller motion compensated predicted error based on the adjacent frames and the original frame typically has a large motion compensation predicted error.

The luminance channel of the image is preferably used to perform cadence detection. However, any channel such as luma, chroma, or a combination of luma and chroma channels of the image may be used for cadence detection.

The information from the cadence detection 110 may be used to modify the noise monitoring and automatic parameter setting 120 which may process the original frames in a manner differently from the copy frames and/or the interpolated frames. In addition, the noise monitoring and automatic parameter setting 120 may process the copy frames and the interpolated frames in a manner different from one another, if desired. Preferably, the copy frame may use the same noise monitoring and automatic parameter settings as the most recent non-copy frame. Also, if the system optionally estimates a set of motion vectors, the system may compute the motion vectors between the original frames and use the same motion vectors for the corresponding copy frames, which increase the computational efficiency of the system. Also, while estimating a set of motion vectors, the system may compute the motion vectors between the original frames and use the same motion vectors for the corresponding interpolated frames, which increase the computational efficiency of the system. Preferably, the noise monitoring and automatic parameter setting 120 does not use motion vectors.

Figure 3A:
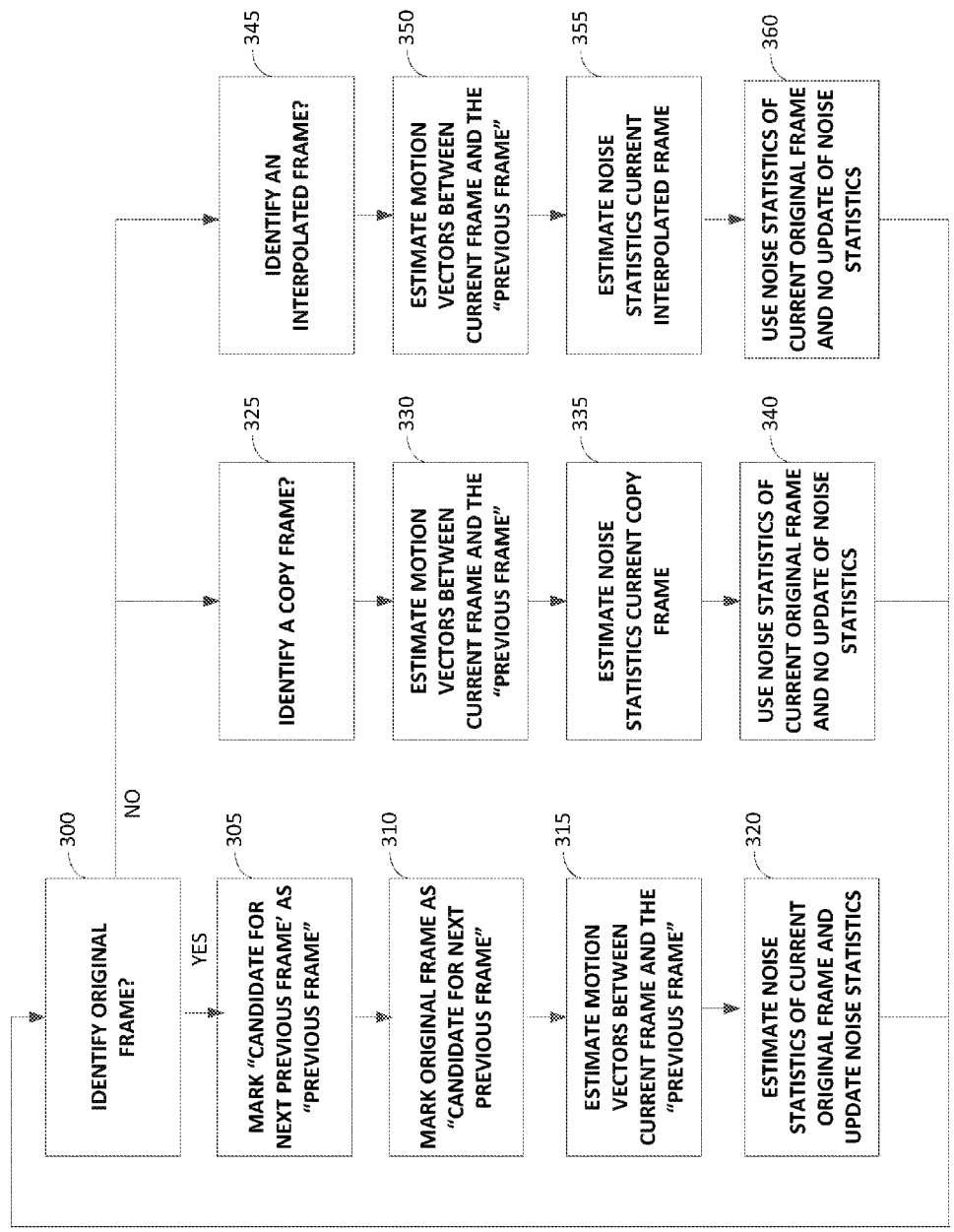
FIGS. 3A, 3B, 3C, and 3D illustrate a noise monitoring process.

Referring to FIG. 3A, the noise monitoring and automatic parameter setting 120 may process the frames based upon the type of frame. Initially, the noise monitoring and automatic parameter setting 120 may determine if the frame is an original frame 300. If the frame is an original frame 300, then a previous frame marked as "candidate for next previous frame" is marked as a "previous frame" 305. Then, the original frame 300 is marked as "candidate for next previous frame" 310. With the marking of the previous original frames completed, the system then estimates the motion vectors between the current frame (i.e., original frame) and the "previous frame" 315. The system then estimates the noise statistics of the current original frame and updates the noise statistics of the video sequence 320.

Figure 3B:
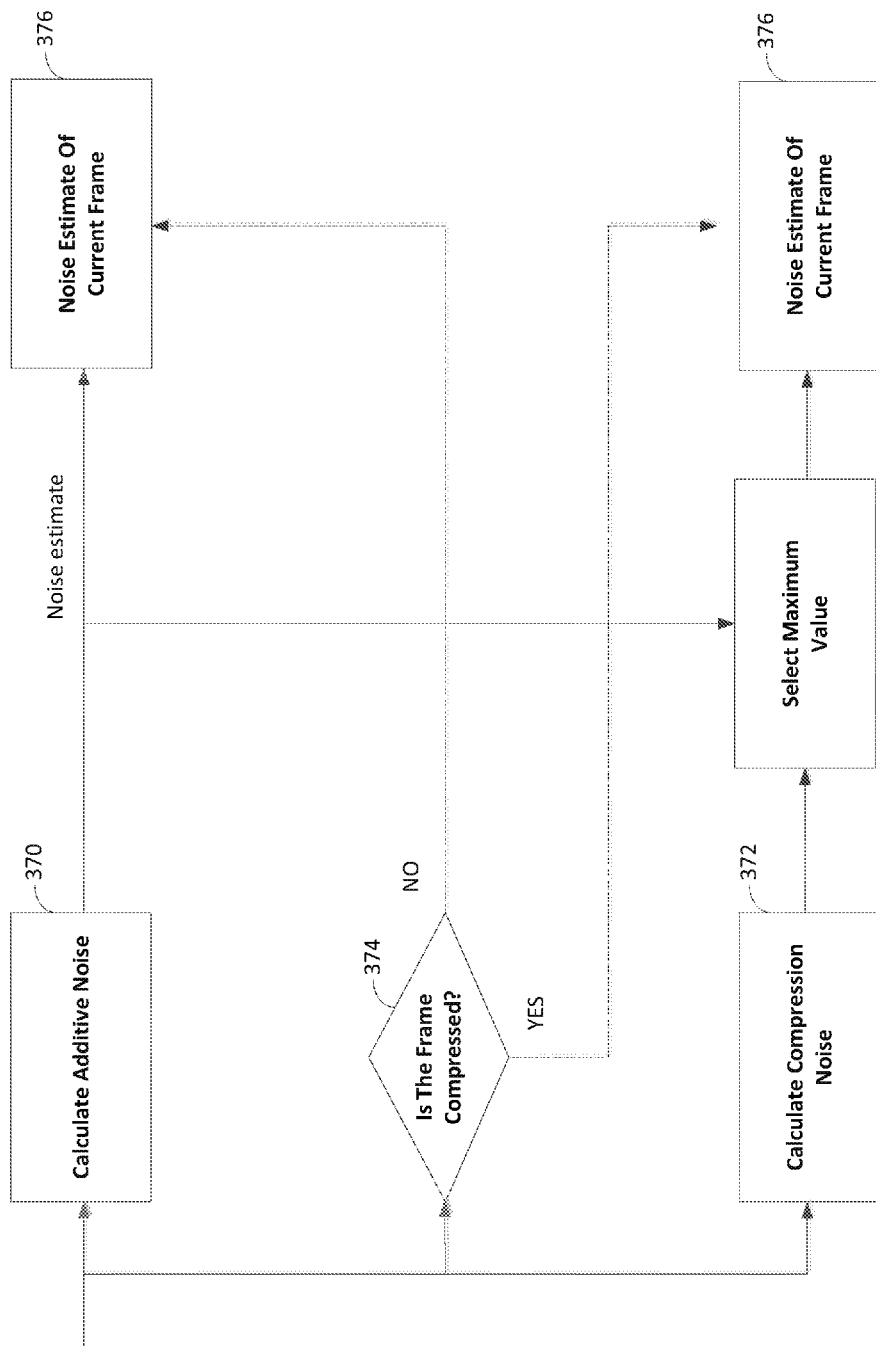

Referring to FIG. 3B, the estimation of the noise statistics 320 may include any suitable technique. One technique may determine an estimate of additive noise 370 and determine an estimate of compression noise 372. Depending on whether the frame is compressed 374, the noise statistics 320 may compute a noise estimate of the current frame 376.

Figure 3C:
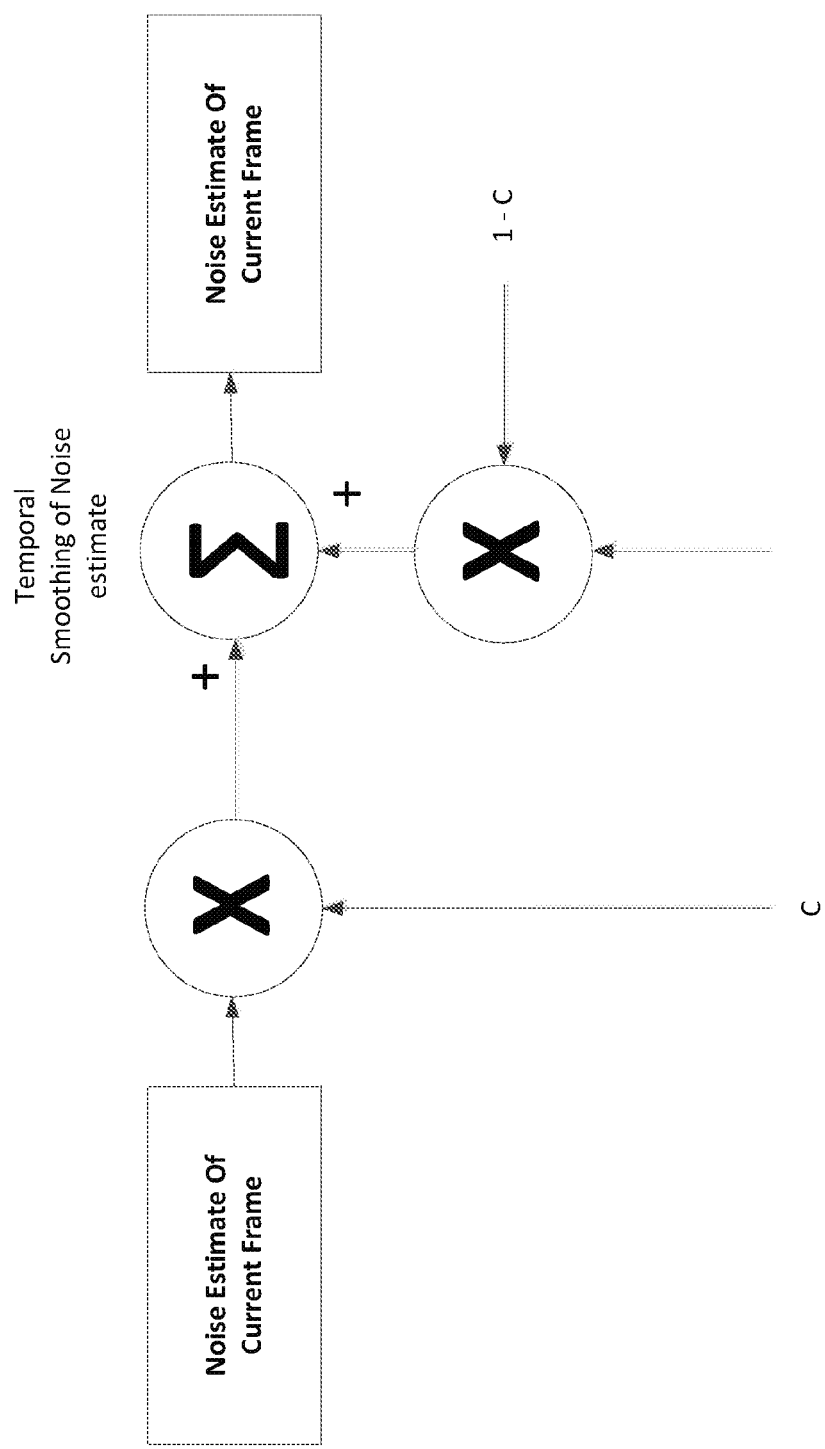

Referring to FIG. 3C, based upon the noise estimate of the current frame 376, the estimation of the noise statistics 320 may refine the noise estimate based upon a previous frame or other parameters.

Figure 3D:
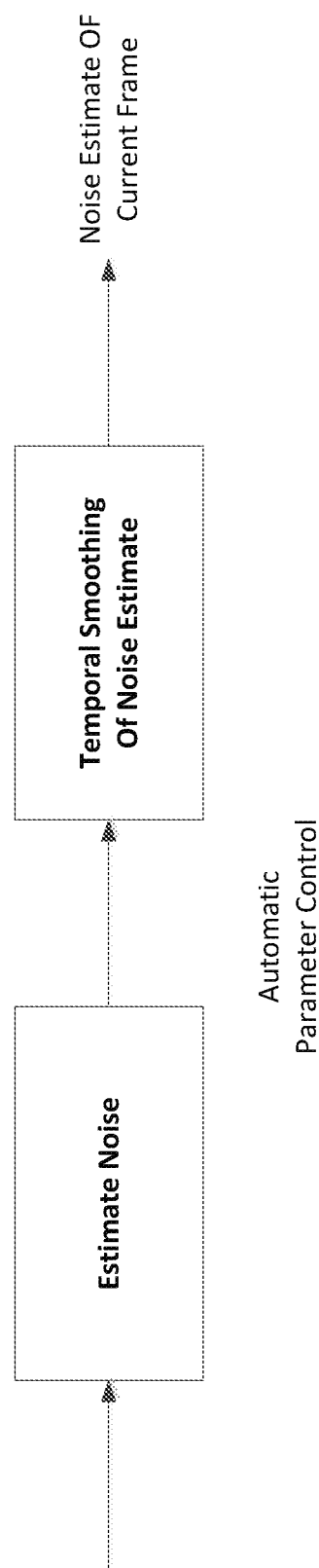

Referring to FIG. 3D, the refined noise estimate may be temporally smoothed to determine a further improved estimation of the noise of the current frame.

If the frame is not an original frame 300, the system selects whether the frame is a copy frame 325 or an interpolated frame 345. If the frame is a copy frame 325 then the system estimates the motion vectors between the current frame (e.g., copy frame) and the "previous frame" 330. The system then estimates the noise statistics of the current copy frame 335. The system uses the noise statistics of the current original frame and does not update the noise statistics 340. Preferably, the system does not expressly identify an interpolated frame.

If the frame is an interpolated frame 345 then the system may optionally estimate the motion vectors between the current frame (e.g., interpolated frame) and the "previous frame" 350. The system then estimates the noise statistics of the current interpolated frame 355. The system uses the noise statistics of the current original frame and does not update the noise statistics 360.

The motion estimation 315, 330, 350, if included, may be performed in any suitable manner. One motion estimation technique is estimating the motion vectors between the current frame and the "previous frame". Another motion estimation technique is estimating the motion vectors between the current frame, one previous frame, and one future frame. Another motion estimation technique is estimating the motion vectors between the current frame, one previous frame, and two future frames. Other techniques not based on motion vectors may be used, as desired.

The noise estimation of the Noise Monitoring and Automatic Parameter Setting 120 may be performed in any suitable manner. By way of example, the system may estimate the compression noise and the system may separately estimate the additive noise. The noise estimate of the current frame t may be the maximum between these two noise estimates and may be represented as follows: $Noise_t = \max(Noise_{Compression}, Noise_{Additive})$. The system may use any combination of the compression noise estimate and the additive noise estimate in order to obtain a noise estimation for the current frame. The system may also perform temporal filtering of the noise estimate to improve consistency and update the final noise estimate. The temporal filtering may be represented as follows: $N_t = w \ast Noise_t + (1-w) \ast Noise_{t-1}$. Where w (0,1) is the weight, $Noist_t$ is the noise estimate of the current original frame, and $Noise_{t-1}$ is the noise estimate of the previous original frame.

The video system may include a scene cut detection 130. The processing of the video may involve reducing the noise through the use of temporal filtering. The temporal filtering typically involves averaging several frames to reduce the appearance of noise. However, temporal processing tends to introduce artifacts at scene cuts in the video by mixing data from the video content that is distinct from one another, namely content on either temporal side of the scene cut. These artifacts may be reduced by limiting the strength of the temporal filtering proximate the scene cut so that minimal artifacts occur when filtering across scene cuts. In addition to the introduction of artifacts at scene cuts in the video as a result of temporal filtering, scene cuts also tend to result in color bleed through artifacts especially when the motion estimation is primarily a low complexity luminance only based technique. It is desirable to include a low complexity luminance based scene cut detection 130 while including temporal filtering modified in a manner that reduces color bleed through artifacts without resorting to increasing its computational complexity by using a full color motion estimation.

Figure 4A:
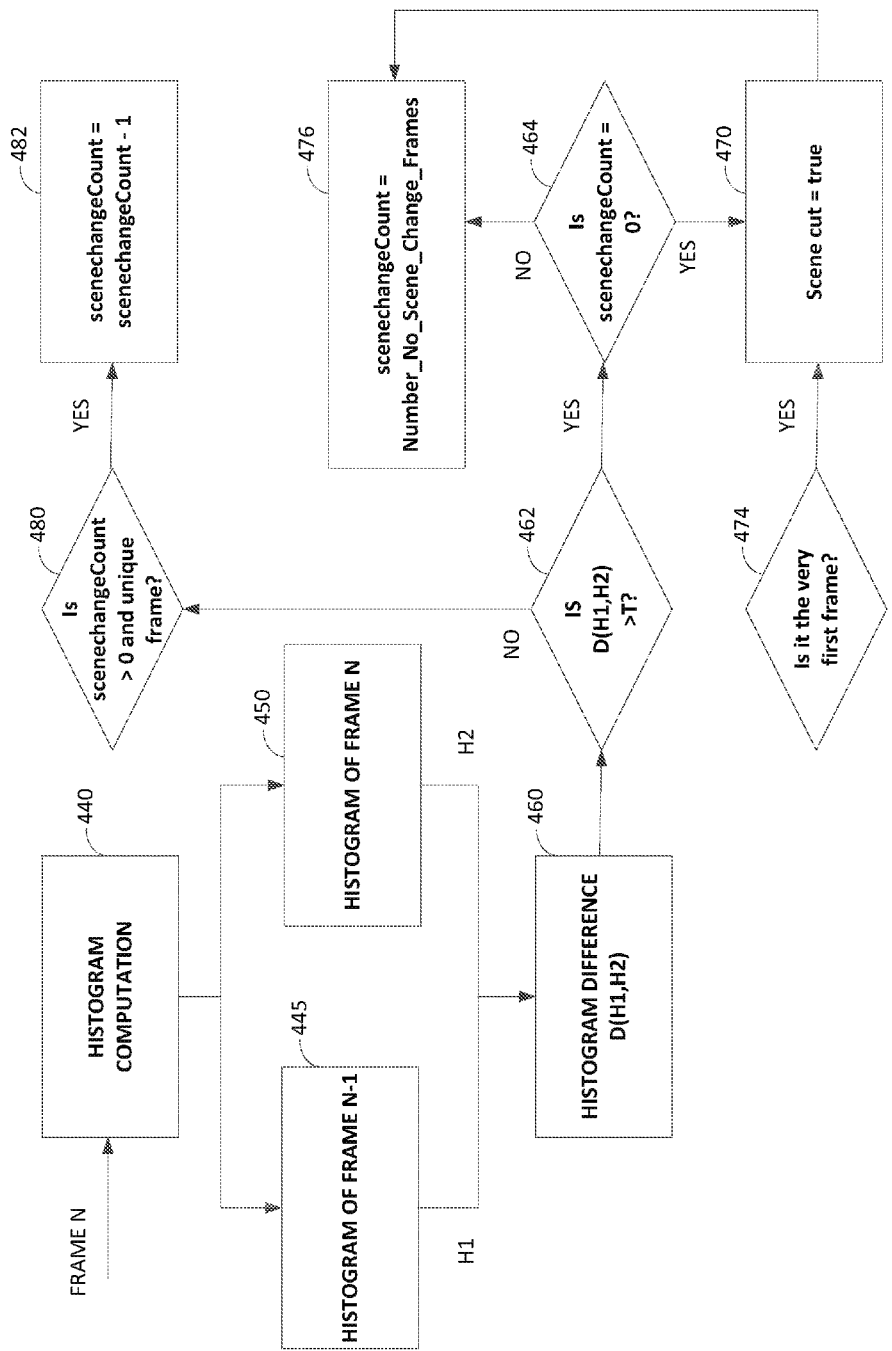
FIGS. 4A and 4B illustrate scene cut detection processes.

Referring to FIG. 4A, the scene cut detection 130 may compute a histogram 440 from each input frame N. A histogram of a current frame N 450 (H2) and a histogram of the previous frame N−1 445 (H1) may be determined (or other statistical measure). The pair of histograms H1 and H2 may be processed in a suitable manner to determine if the content of the frames has sufficiently changed to identify a scene cut. A histogram difference 460 may be calculated based upon the pair of histograms H1 and H2. For example, the histogram difference may be $D(H1, H2) = \Sigma_{i=1}^{N} |H_1(i) - H_2(i)|$. The system may determine if the histogram difference 460 is greater than a threshold T 462. If the histogram difference 462 is sufficiently large then the scene cut detection 130 determines if the scene change count is 0 464. If the scene count is 0 then a scene cut parameter is set to true 470. In addition, if the frame is the very first frame 474 then the scene cut parameter is set to true 470. Then the scenechangeCount=number_no_scene_change_frames 476 (a fixed threshold value). If the scene change count is not zero 464, then the scene change count is set to the number_no_scene_change_frames 476 (a fixed threshold value). If the histogram difference 462 is not greater than the threshold, then the scene cut detection 130 checks if the scene change count is greater than 0 and the frame is a unique frame 480. If the scene change count is greater than 0 and it is a unique frame 480, then the scene change count is decreased by 1 482. Thus no scene change will be reported for at least number_no_scene_change_frames after a scene cut. The complexity of the scene cut detection 130 may be reduced by using histograms which contain relatively few elements, e.g., 256 for an 8-bit histogram compared to approximately 2 million color pixels for a high definition image. The scene cut detection preferably uses only the luminance channel, but other channels such as luma, chroma, or a combination thereof may likewise be used. It is noted that a one frame delay in the detection of the scene cut may be included, if desired.

Figure 4B:
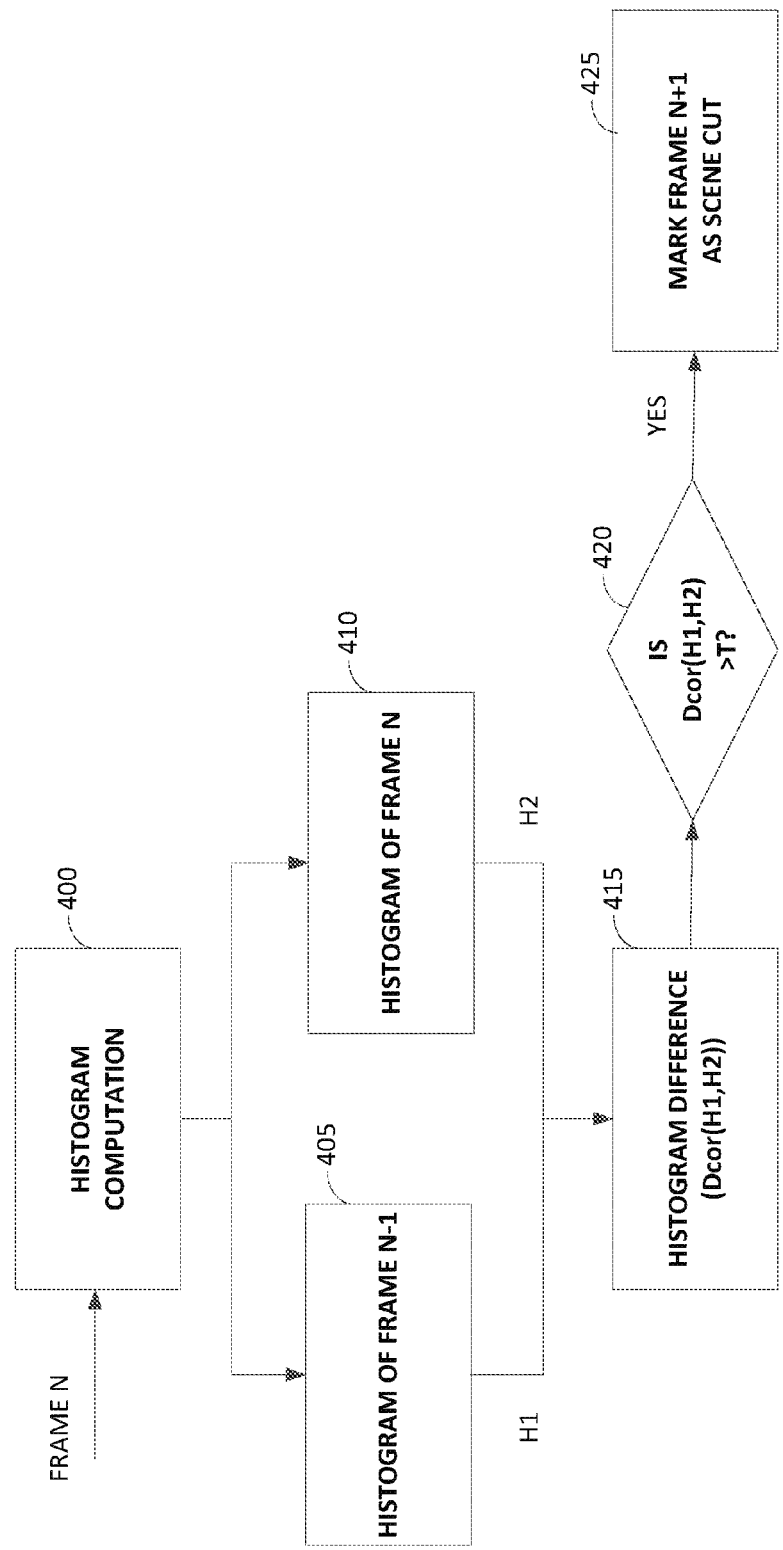

Referring to FIG. 4B, the scene cut detection 130 may compute a histogram 400 from each input frame N. A histogram of a current frame N 410 (H2) and a histogram of the previous frame N−1 405 (H1) may be determined (or other statistical measure). The pair of histograms H1 and H2 may be processed in a suitable manner to determine if the content of the frames has sufficiently changed to identify a scene cut. A correlated histogram difference 415 may be calculated based upon the pair of histograms H1 and H2. The system may determine if the correlated histogram difference 420 is greater than a threshold T 420. If the correlated histogram difference 420 is sufficiently large then Frame N+1 is marked as a scene cut 425. The complexity of the scene cut detection 130 may be reduced by using histograms which contain relatively few elements, e.g., 256 for an 8-bit histogram compared to approximately 2 million color pixels for a high definition image. The scene cut detection preferably uses only the luminance channel, but other channels such as luma, chroma, or a combination thereof may likewise be used. It is noted that a one frame delay in the detection of the scene cut may be included, if desired.

The output of the scene cut detection 130 is provided to a motion compensated temporal filter 140. In particular, the output of the scene cut detection 130 may be provided to a temporal filter 150. The input frames 100 may likewise be provided to the temporal filter 150. The temporal filter 150 may be modified, based upon the location of the scene cuts provided by the scene cut detection 130, in such a manner that the artifacts that would have otherwise occurred proximate the scene cuts are reduced. The input frames 100 may also be provided to a motion estimation 160, which estimates the motion between a plurality of the input frames 100. The output of the motion estimation 160 may be provided to the temporal filter 150 to further modify the output of the temporal filter in such a manner that the artifacts that would have otherwise occurred proximate the scene cuts are reduced. The temporal filter 140 may omit the motion estimation 160, if desired. In an embodiment that the motion estimation 160 is omitted, the input and the output resolution would preferably be the same.

Figure 5:
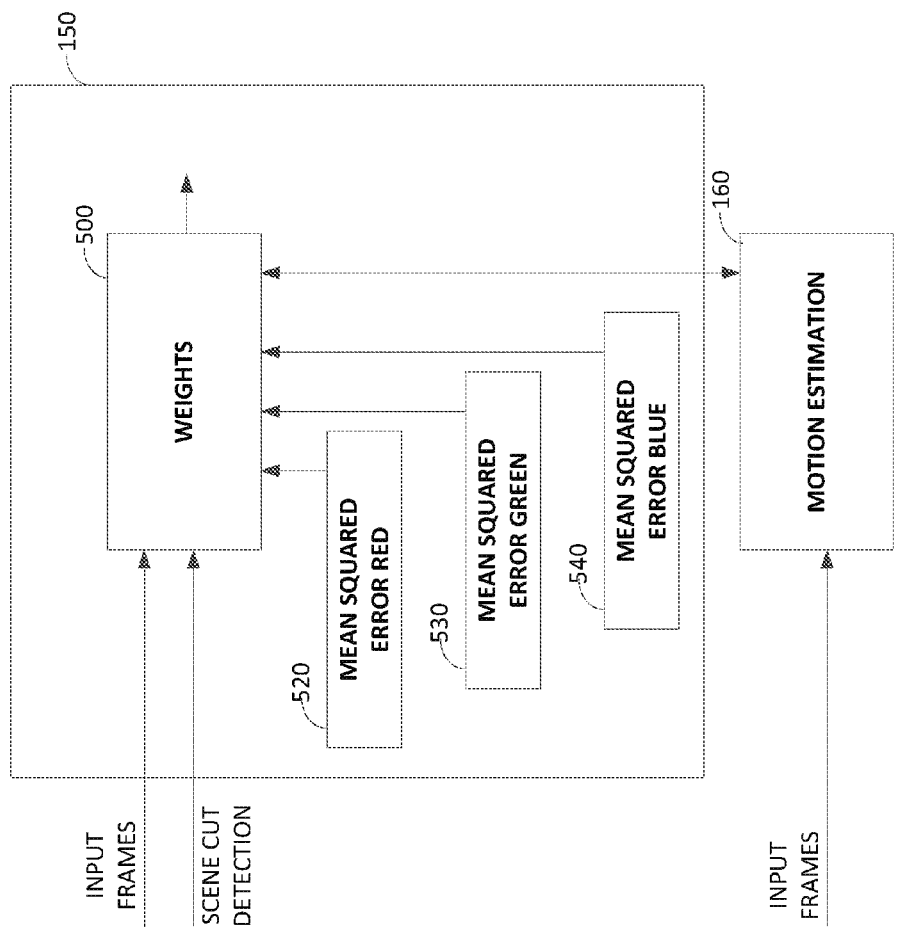
FIG. 5 illustrates a motion compensated temporal filter.

Referring to FIG. 5, the temporal filter 150 may modify its weights 500 while performing the temporal filtering based upon the scene cut detection. Also, while performing the temporal filtering the system may calculate the mean squared error (or other statistical measure). The system may calculate the mean squared error using only the luminance channel. Despite having an explicit scene change detection that turns off temporal filtering by modifying the weights, it is observed that some color bleed artifacts still occur across the scene changes. These artifacts are due to calculating weights between pixels with distinct colors but similar luminance. The result of temporal filtering in such a case is that the color from the prior frame bleeds through to the result of the current frame. In order to reduce such artifacts, instead of computing the mean and the standard error of the luminance channel while computing the mean squared error, the system may compute the mean and the standard error (or other statistical measure) of each of the three color channels. Then the system may compute the weighted sum of the mean and the standard error of the three color channels 520, 530, 540 and use those values for further processing. This reduces, and in many cases eliminates, the color bleed through artifacts. The system may use weights of 3, 3, and 2 for the red, green, and blue channels, respectively. Other combinations may likewise be used, if desired.

Figure 6:
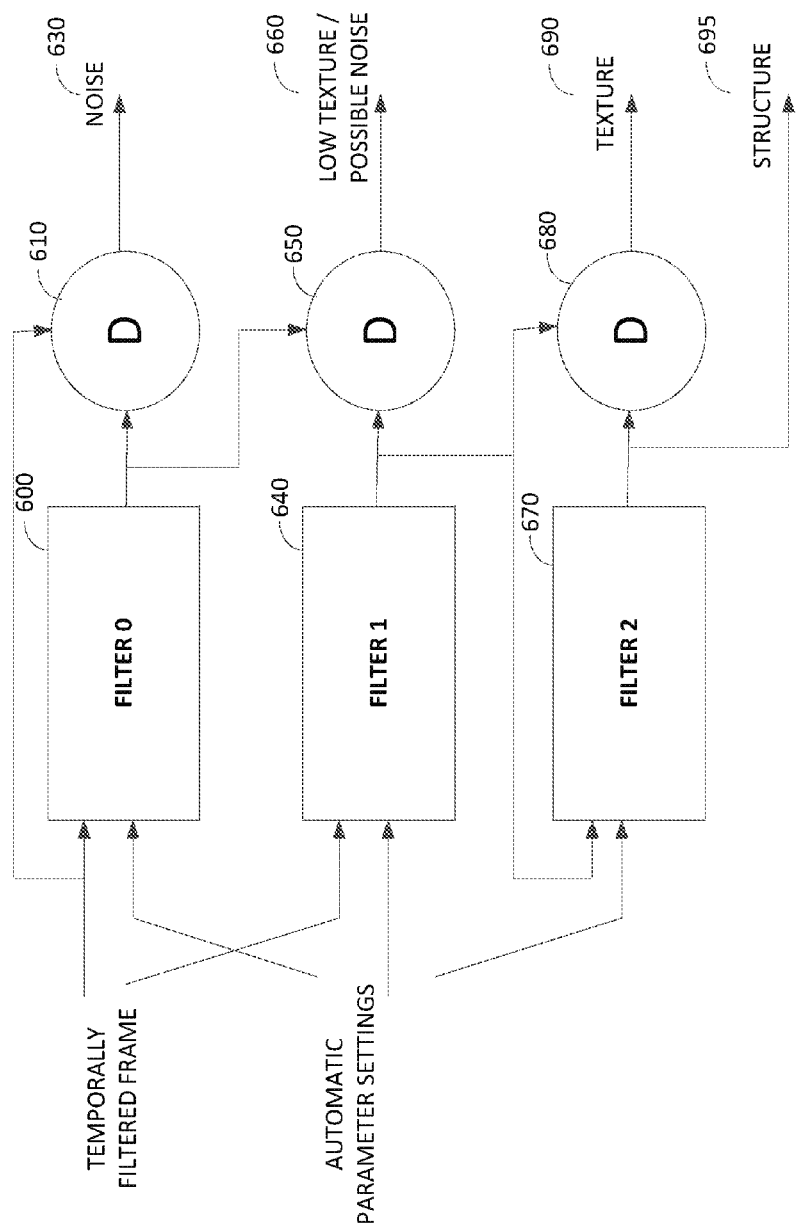
FIG. 6 illustrates a spatial noise reduction and enhancement process.

Referring also to FIG. 6, the system may include a spatial noise reduction and enhancement 170. The temporally filtered frames from the temporal filter 150 may be provided as inputs to the spatial noise reduction and enhancement 170. The temporally filtered frames are provided to a Filter 0 600, which is preferably an edge preserving filter such as a bilateral filter. The Filter 0 600 may also receive noise filtering parameters, such as a $\sigma_n$, which may be based on the noise statistics estimate of the input frame. In particular, the noise filtering parameter may also be modified by a scaling factor A, such as $A\sigma_n$. A difference operation 610 may determine the difference between the output of Filter 0 600 and the temporally filtered frame. The output of the difference operation 610 may be identified as noise 630. Other filtering operations and modification operations may similarly be used to determine an estimate of the noise 630 in the frame.

The temporally filtered frames are provided to a Filter 1 640, which is preferably an edge preserving filter such as a bilateral filter. The Filter 1 640 may also receive noise filtering parameters, such as a $\sigma_n$, which may be based on the noise statistics estimate of the input frame. In particular, the noise filtering parameter may also be modified by a scaling factor B, such as $B\sigma_n$. A difference operation 650 may determine the difference between the output of Filter 1 640 and the filtered frame from the Filter 0 600. The output of the difference operation 650 may be identified as low texture/possible noise 660. Other filtering operations and modification operations may similarly be used to determine an estimate of the low texture/possible noise 650 in the frame. This channel contains, in general, a combination of the noise content of the image and the texture content of the image.

The output of the Filer 1 640 is provided to a Filter 2 670, which is preferably an edge preserving filter such as a bilateral filter. The Filter 2 670 may also receive noise filtering parameters, such as a $\sigma_n$, which may be based on the noise statistics estimate of the input frame. In particular, the noise filtering parameter may also be modified by a scaling factor C, such as $C\sigma_n$. A difference operation 680 may determine the difference between the output of Filter 2 670 and the output of Filter 1 640. The output of the difference operation 680 may be identified as texture 690. Other filtering operations and modification operations may similarly be used to determine an estimate of the texture 690 in the frame. The noise filtering parameters, such as a $\sigma_n$, may be locally spatially varying across the image. The noise filtering parameters, such as a $\sigma_n$, may also be modified depending on the amount of compression noise and/or the presence of edges to reduce ringing noise.

The output of Filter 2 670 may be referred to as structure 695. Other filtering operations and modification operations may similarly be used to determine an estimate of the structure 695 in the frame. The Filter 0 preferably uses a 5×5 kernel, the Filter 1 preferably uses a 5×5 kernel, and the Filter 2 preferably uses a 3×3 kernel. Other filter sizes may likewise be used. Also, one or more of the filters may omit the corner pixels. Preferably A is less than B, preferably B is less than C, preferably A is less than C, preferably C is much greater than B (e.g., C>>B), and $\sigma_n$ is the spatially varying noise estimate. These values may be calculated during temporal filtering based upon the motion compensated frames and/or the noise estimate. $\sigma_n$ may also be a co-variance matrix, which may also locally modify $\sigma_n$ to reduce ringing artifacts.

Figure 7:
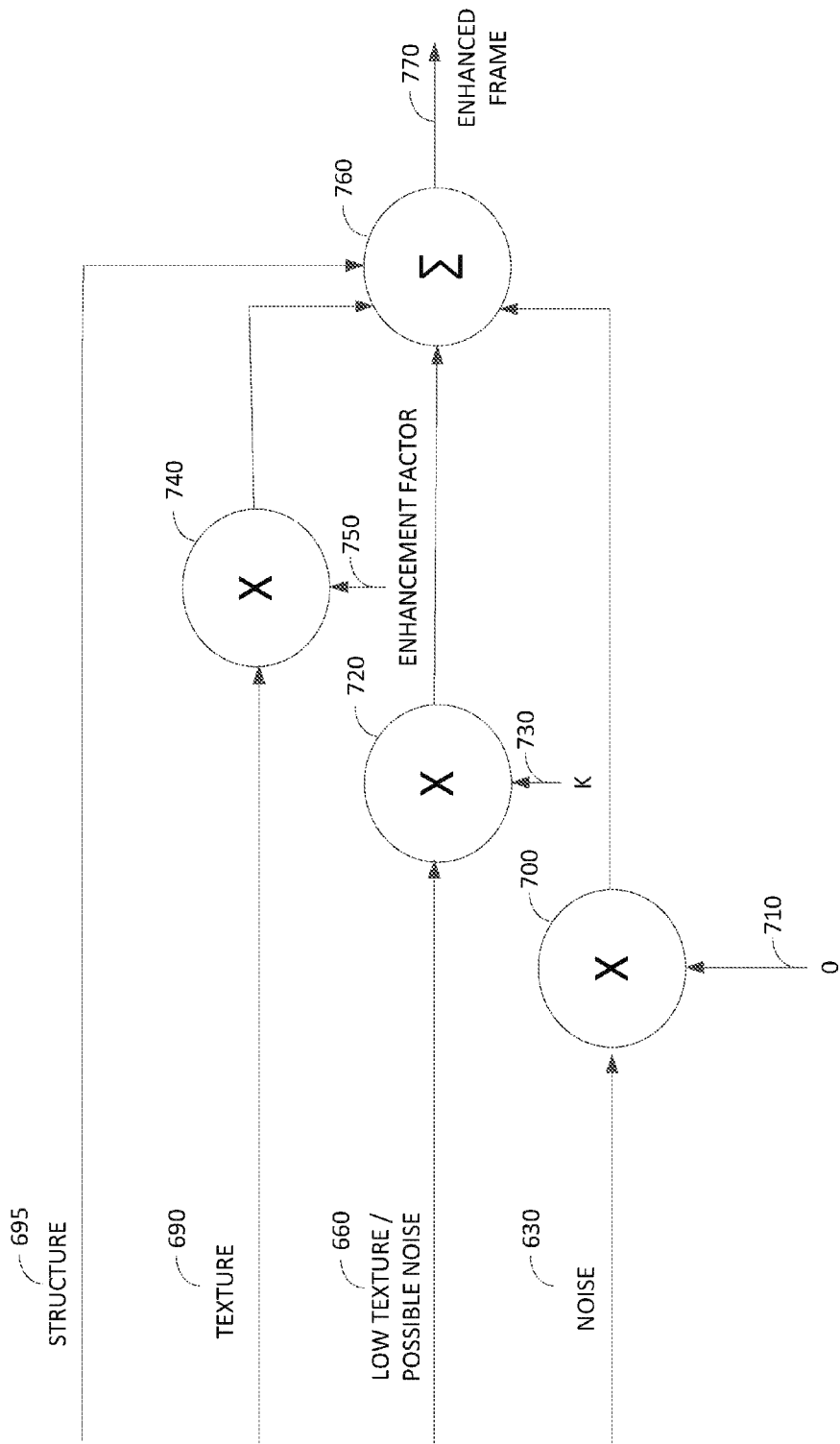
FIG. 7 illustrates processing of four channels of a frame.

Referring to FIG. 7, the four different channels obtained by using the filters in the framework illustrated in FIG. 6 may be further processed to obtain an enhanced image. The noise channel 630 may be attenuated or removed in order to reduce the noise. The noise channel 630 may be attenuated to zero by multiplying it 700 by a scalar value 710, such as 0. The noise channel 630 may be attenuated to a value greater than zero by multiplying it 700 by a scalar value 710, such as a number less than 1 but greater than 0.

The low texture/possible noise channel 660 may be attenuated in order to reduce the noise but is preferably not attenuated to zero because the channel likely contains some texture components of the image that are visually pleasing to the viewer. The low texture/possible noise channel 660 may be attenuated by multiplying it 720 by a scalar value 730, such as K. The scalar value 730 is preferably less than 1 and greater than 0.

The texture channel 690 typically primarily contains the texture components of the image which may be sharpened and/or enhanced to improve the details present in the input image. In order to enhance the details of the image the texture channel 690 may be multiplied 740 by an enhancement factor 750, which is typically greater than 1. Alternatively, the system can use an adaptive enhancement factor 750.

The structure channel 695 is preferably not modified by a multiplication factor. Alternatively, the structure channel 695 may be modified by a scalar factor.

The channels 630, 660, 690, 695 (i.e., removed/attenuated noise channel 630, attenuated possible noise/low texture channel 660, enhanced texture channel 690, and the unmodified structure channel 695 may be combined together 760 to obtain an enhanced frame 770.

It has been determined that generally non-compressed video sequences have an improved image quality with a greater enhancement factor 750 and that generally compressed video sequences have an improved image quality with a lower enhancement factor 750. With increased compression of the video sequence additional noise tends to be present in the video sequence, that when amplified, tends to degrade the image quality. Depending on the extent to which a video frame has been compressed, it is desirable to modify the enhancement factor 750. By way of example, the enhancement factor 750 may be modified between an upper bound and a lower bound.

Figure 8:
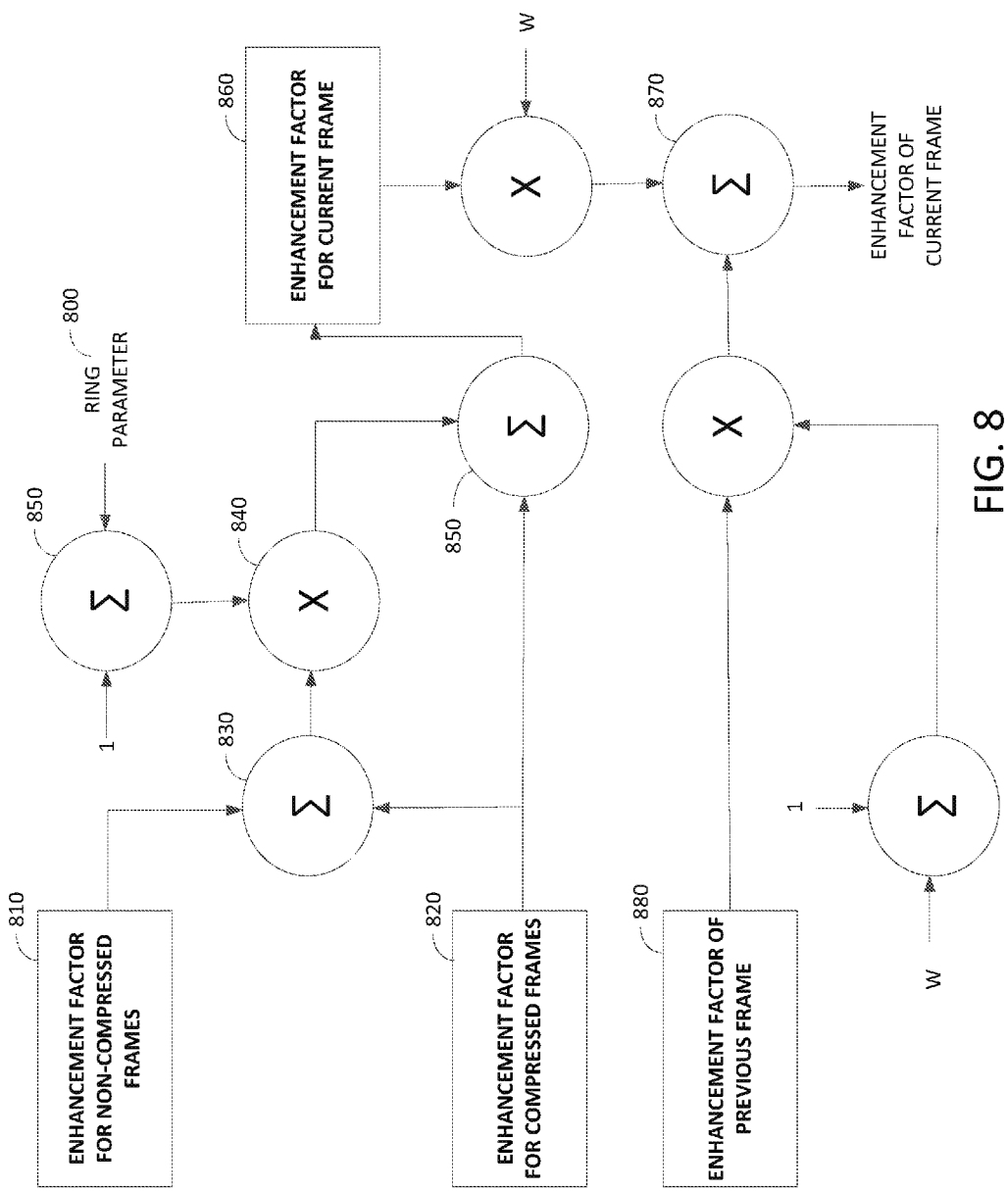
FIG. 8 illustrates an enhancement factor determination process.

Referring to FIG. 8, a ring parameter 800 may be determined which characterizes how much compression is present in the frame. The ring parameter 800 may characterize a ratio between the compressed noise estimate and the sum of the compressed noise estimate and the additive noise estimate. In this manner, if a frame is not compressed then the ring parameter is 0 and if a frame is compressed then the ring parameter is closer to 1. By way of example, the bounds between the upper bound 810 (e.g., enhancement factor for non-compressed sequences) and the lower bound 820 (e.g., enhancement factor for compressed sequences) of the compression factor may be subtracted from one another 830 and multiplied 840 by the complement 850 of the ring parameter 800 (e.g., 1 minus ring parameter 800). The multiplied 840 difference enhancement factor is added to the lower bound 820 to determine the enhancement factor for the current frame 860. As a result, for non-compressed frames, the enhancement factor is closer to the upper bound of the enhancement factor. As a result, for compressed frames, the enhancement factor is closer to the lower bound of the enhancement factor. As a result, for frames with an intermediate amount of compression, the enhancement factor will tend to be generally intermediate between the upper bound and the lower bound. In addition, the spatial noise reduction and enhancement 170 may also include temporal smoothing of the enhancement factor 860 by averaging it 870 with the enhancement factor of the previous frame 880 to increase the robustness in the case of the misclassification of the compression characteristics.

Figure 9:
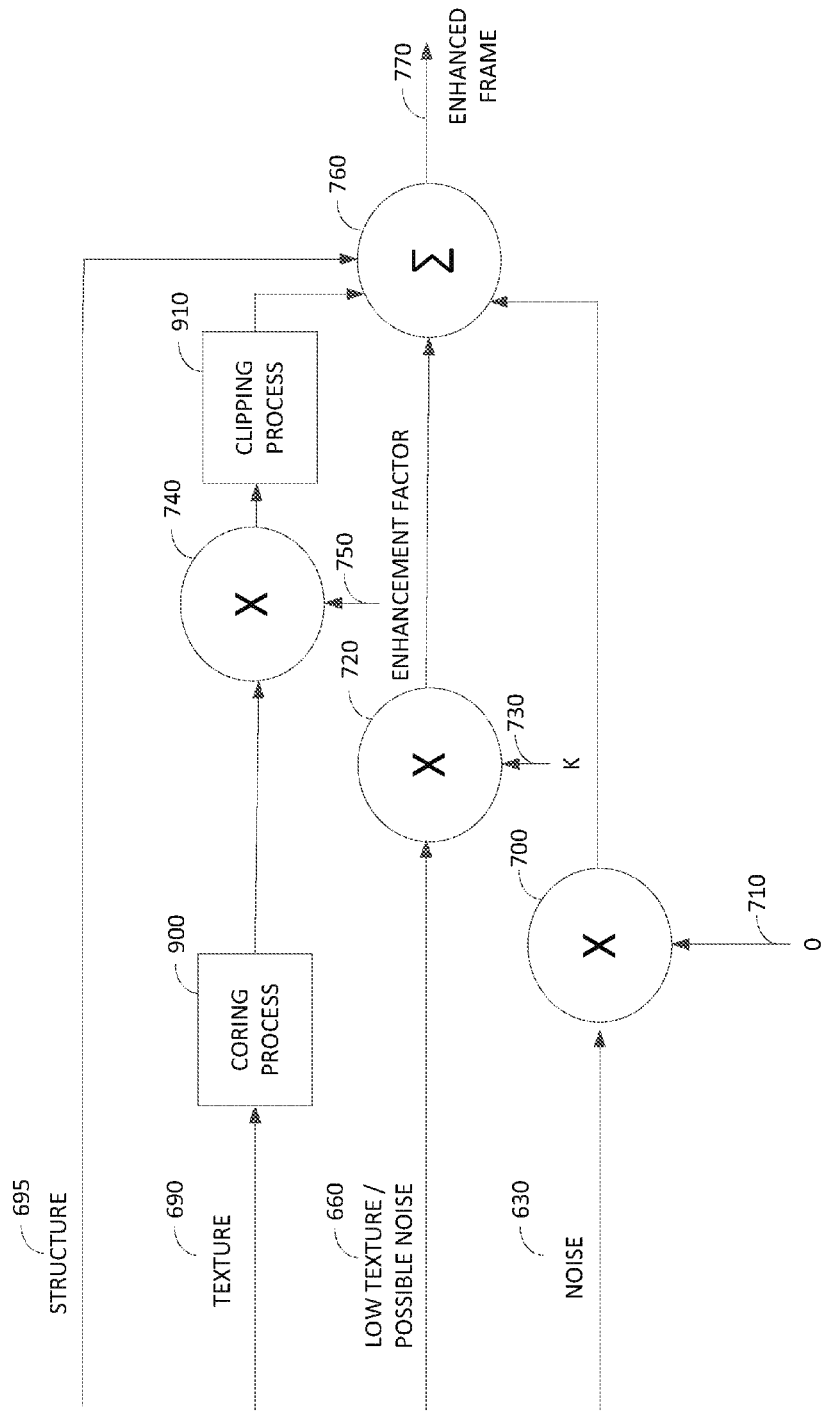
FIG. 9 illustrates a system with a coring process and a clipping process.

During the spatial noise reduction process, when the system detects a frame is sufficiently compressed, the system performs an aggressive smoothing of the frame. As a result of the aggressive smoothing of the frame, while the system attenuates the noise, the system also tends to remove some intermediate frequency image information which tends to result in a "contouring" or an "oil painting" effect, especially for facial images. Referring to FIG. 9, the spatial noise reduction and enhancement 170 preferably performs a coring process 900 to reduce the contouring artifacts. The coring process 900 reduces the noise component in the frame.

Figure 10:
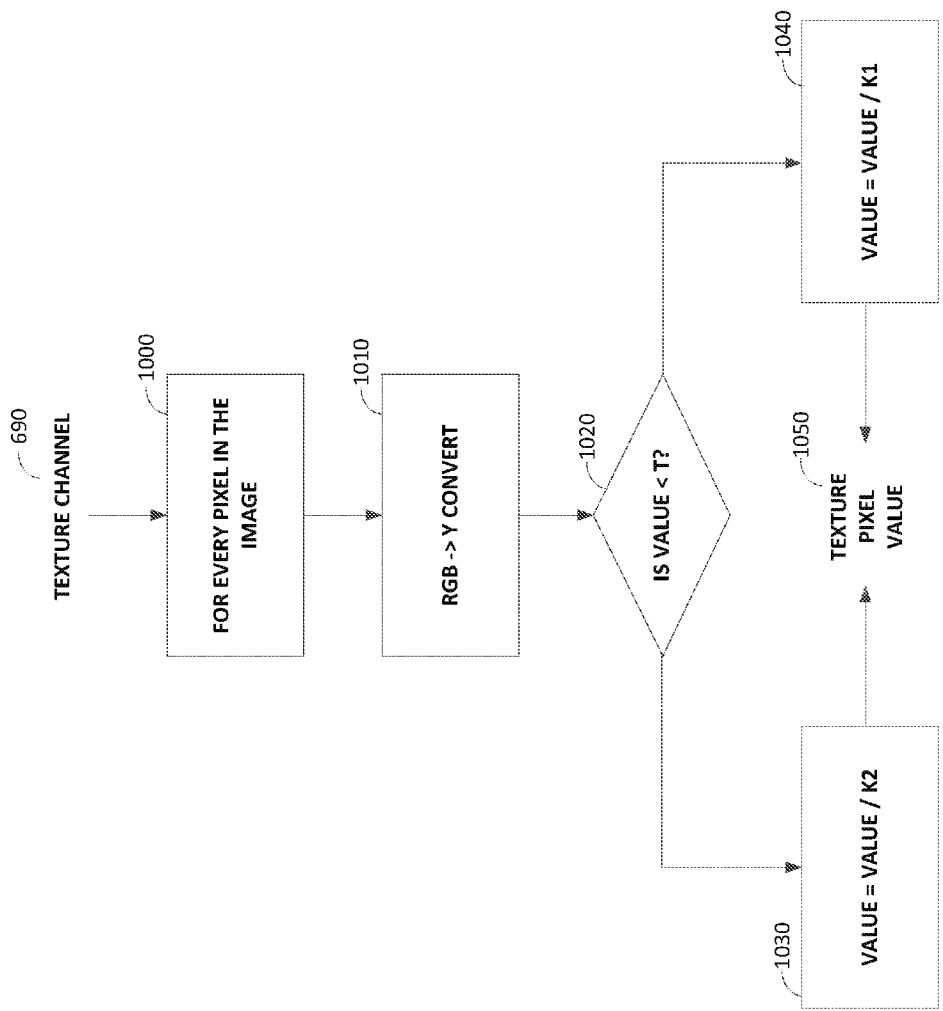
FIG. 10 illustrates a coring process.

Referring to FIG. 10, the coring process 900 may add to the frame some spurious spatial frequency components, especially along the edges of the contours, in order to result in the transition being smoother and thus reduce the "contouring" artifacts. The coring process 900 may receive the texture channel 690 and process each (or a selected set of) of the pixels in the frame 1000. Each (or a selected set of) of the pixels in the frame 1000 may be converted from red, blue, green color space to a luminance (e.g., Y) value 1010. Other conversions may likewise be used, as desired. If the luminance is less than a coring threshold 1020 (e.g., T) then the luminance may be modified in a first manner, such as dividing its value by K2 1030. If the luminance is greater than or equal to a coring threshold 1020 (e.g., T) then the luminance may be modified in a second manner, such as dividing its value by K1 1040. K1 is different than K2. The result of the division 1030, 1040 may be combined together to determine the resulting texture pixel value 1050. As a result the coring process 900 the "contouring" or "oil painting" artifacts are reduced, especially for facial images.

During the spatial noise reduction process when the system uses a high value of the enhancement factor, then the value of the pixels in the texture channel may become excessively high. As a result of the high texture values, it may potentially result in overshoots in the image. In order to reduce the overshoots in the image, the texture channel may be clipped. Referring to FIG. 9, the spatial noise reduction and enhancement 170 preferably performs a clipping process 910 to reduce the overshoots. The clipping process 910 reduces the noise component in the frame.

Figure 11:
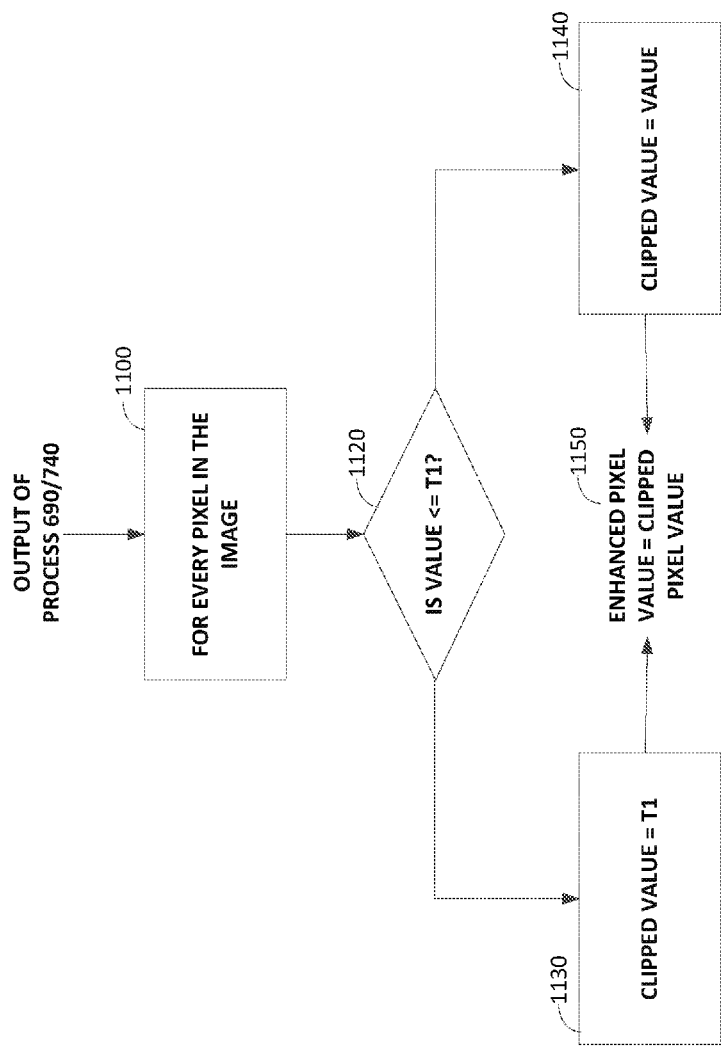
FIG. 11 illustrates a clipping process.

Referring to FIG. 11, the clipping process 910 may receive the texture channel 690 and process each (or a selected set of) of the pixels in the frame 1100. If the value of the pixel has a color component less than or equal to a threshold 1120, then the clipped value of the pixel is modified in a first manner, such as setting the clipped value to the threshold (e.g., T1) 1130. If the value of the pixel has a color component greater than the threshold 1120, then the clipped value of the pixel is modified in a second manner, such as setting the clipped value to the value (e.g., pixel value) 1140. The results of setting the clipped values 1130, 1140 may be combined together to determine the resulting pixel values of the frame 1150. As a result the clipping process 910 the "overshooting" artifacts are reduced, especially for facial images.

Figure 12:
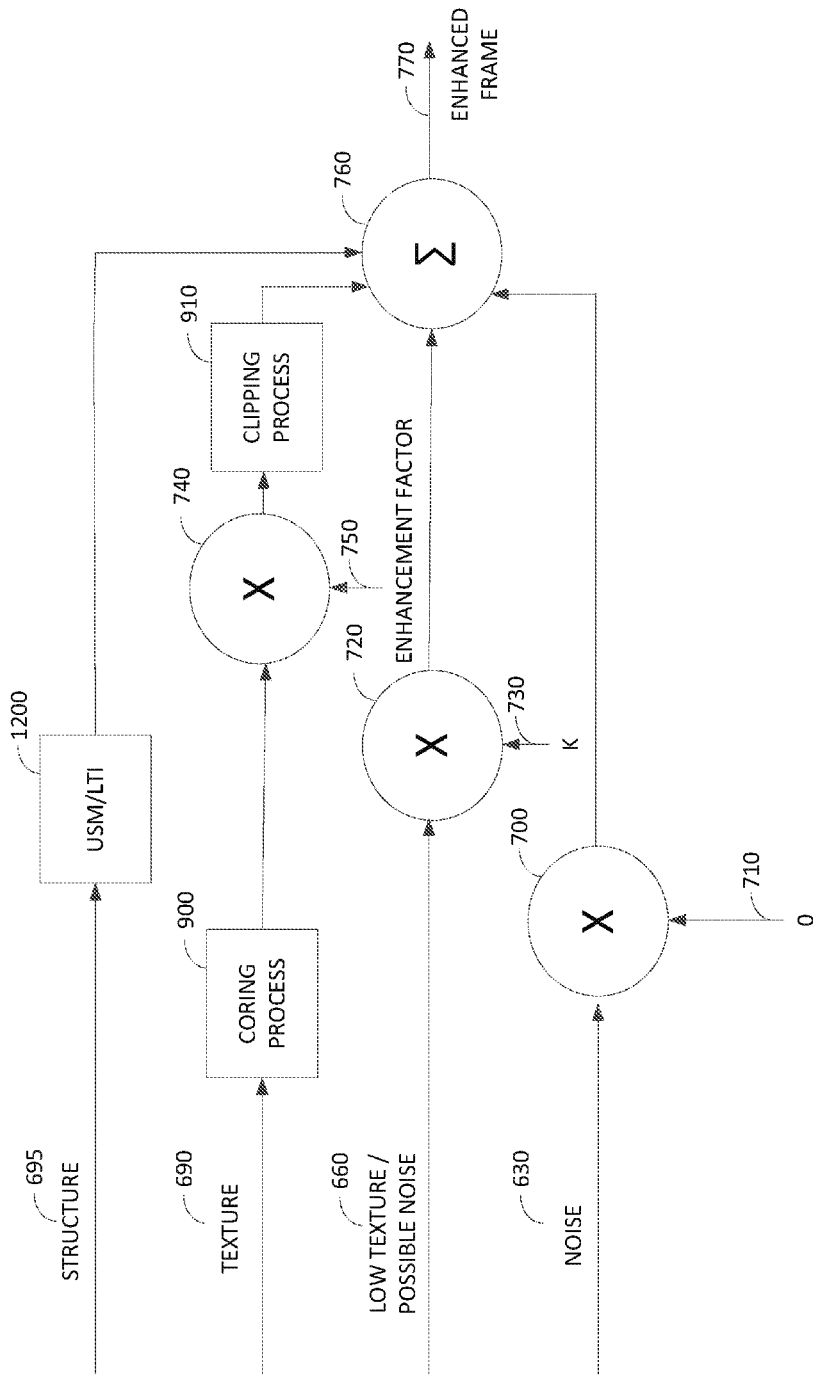
FIG. 12 illustrates an enhancement of a structural channel.

Referring to FIG. 12, the system may perform enhancement of the structure channel 695 by performing an unsharp mask ("USM") enhancement and/or a luminance transient improvement ("LTI") enhancement 1200 on structure channel 695. It has been observed that the USM/LTI results in creating thin edges when applied to the original frame image and also results in enhancement of the noise in the frame. As a result, it is desirable to apply USM/LTI 1200 only to structure channel 695 (or less than the entire image content) of the frame because it contains primarily edges and limited noise. In another embodiment, the USM/LTI 1200 may be omitted, if desired.

Figure 13:
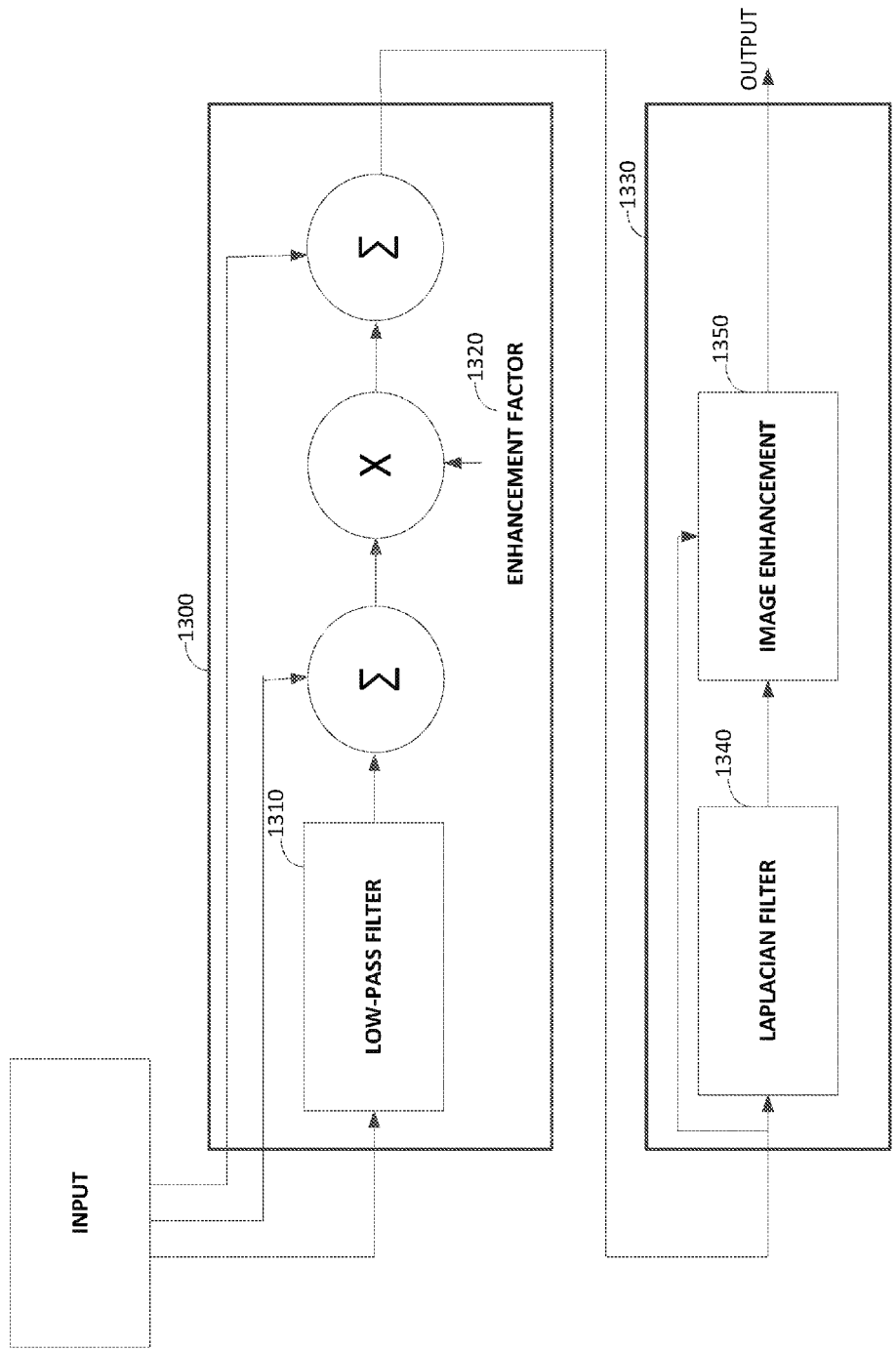
FIG. 13 illustrates an enhancement process.

Referring to FIG. 13, an exemplary unsharp mask enhancement 1300 is illustrated that includes a low pass filter 1310 and an enhancement factor 1320. Preferably, a Gaussian low pass filter is used. The unsharp mask enhancement 1300 may compute the difference between the input image and the filtered image, such as by using a 3×3 Gaussian kernel. This difference image contains primarily high frequency information and it may be multiplied by the enhancement factor 1320. The enhancement factor is typically a scalar factor and is greater than 1, such as a value of 3. The unsharp mask may add the input image back to the enhanced difference image (e.g., containing the higher frequency information) in order to obtain the sharpened image.

Other unsharp mask enhancements may likewise be used, as desired. The output of the unsharp mask enhancement 1300 is provided to the luminance transient improvement enhancement 1330. The luminance transient improvement enhancement 1330 may include a Laplacian filter 1340 and an image enhancement 1350. The luminance transient improvement may be performed on each of the color channel of the frame. The Laplacian filter filters each of the color channels, such as using a 3×3 kernel. For each pixel of the filtered image, the system may compute a ratio as follows: $r(i,j)=[abs(P(i,j))]/[abs(P(i,j))+C]$. $P(i,j)$ is the value of the pixel of the filtered image with x coordinate as i and the y coordinate as j and C is a constant, such as 0.3. The value of C determines the strength of the luminance transient improvement. For every pixel of the input to the luminance transient improvement, it may consider a N×N neighborhood (e.g., 3×3) and compute the local minimum (e.g., $I_{min}$) and the local maximum (e.g., $I_{max}$) of that neighborhood. Decreasing C increases the strength of the luminance transient improvement by pushing the pixels closer to the local maximum or local minimum.

The enhanced pixel value may depend on the value of the filtered image as follows.

If the value of the filtered image is greater than a threshold T, then the luminance transient improvement computes the enhanced pixel value as $F(i,j)=U(i,j)-r(i,j)\cdot(U(i,j)-I_{min}(i,j))$. $U(i,j)$ is the pixel value of the input to the luminance transient improvement and $F(i,j)$ is the enhanced pixel value.

If the value of the filtered image is less than a threshold T, then the luminance transient improvement computes the enhanced pixel value as $F(i,j)=U(i,j)+r(i,j)\cdot(I_{max}(i,j))-U(i,j))$. $U(i,j)$ is the pixel value of the input to the luminance transient improvement and $F(i,j)$ is the enhanced pixel value.

If the value of the filtered image is the same as the threshold T, then the enhanced pixel value is the same as the input pixel value, namely, $F(i,j)=U(i,j)$.

The USM/LTI primarily does enhancement of thin lines and thus the video tends to look sharper. However, due to lack of spatial noise reduction, this technique tends to enhance noise in the video if all the noise is not temporally filtered.

Other luminance transient improvement enhancements may likewise be used, as desired.

The processing of the spatial noise reduction and enhancement may be done on any luma, chroma, or combination thereof. Moreover, any function of the processing may be done on any luma, chroma, or combination thereof.

Referring again to FIG. 1, the system may perform up-scaling of the frames 180, such as a 2 times factor of up-scaling. Any desirable up-scaling factor may be used. The upscaling preferably uses a directional interpolated Lanczos filter. The upscaling 180 may be omitted, if desired. In an embodiment that the upscaling 180 is omitted, the input and the output resolution would preferably be the same.

Figure 14:
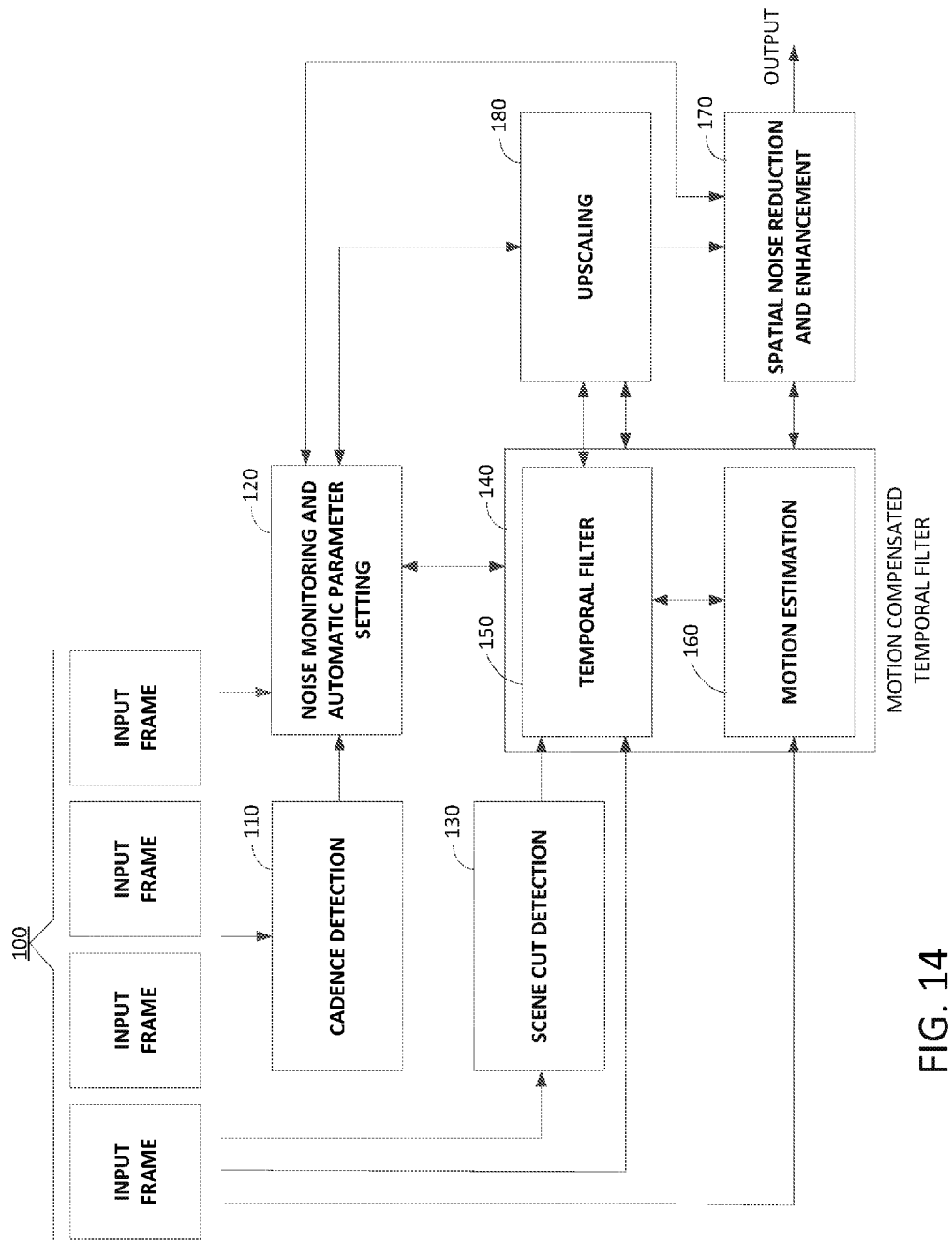
FIG. 14 illustrates another technique to enhance frames of a video.

Referring to FIG. 14, in another embodiment, the upscaling 180 and the spatial noise reduction and enhancement 170 are changed in their order with respect to FIG. 1. This arrangement tends to result in an improved output image. The spatial noise reduction may use a control value from the temporal filter. While any suitable control value may be used, one exemplary control value may be the $\sigma_n$ value (e.g., a co-variance matrix) from the temporal filter. In the embodiment shown in FIG. 1, $\sigma_n$ was provided for the images used by the temporal filter and the spatial filter, which both had the same resolution. In the embodiment shown in FIG. 14, however, the input to the spatial filter has a different resolution than the temporal filter. In the case of using a 2× up-scaling factor the frames have twice the resolution. In this manner, the system may use a corresponding up-scaled co-variance matrix, such as by duplicating entries. This matches the resolution of the co-variance matrix to the resolution of the input image (to the spatial noise reduction process). If desired, the system may multiply each value of $\sigma_n$ by a constant scalar factor K, such as 0.5. To achieve a reduction in ringing artifacts, the system may locally modify the co-variance values after performing pixel duplication.

Figure 15:
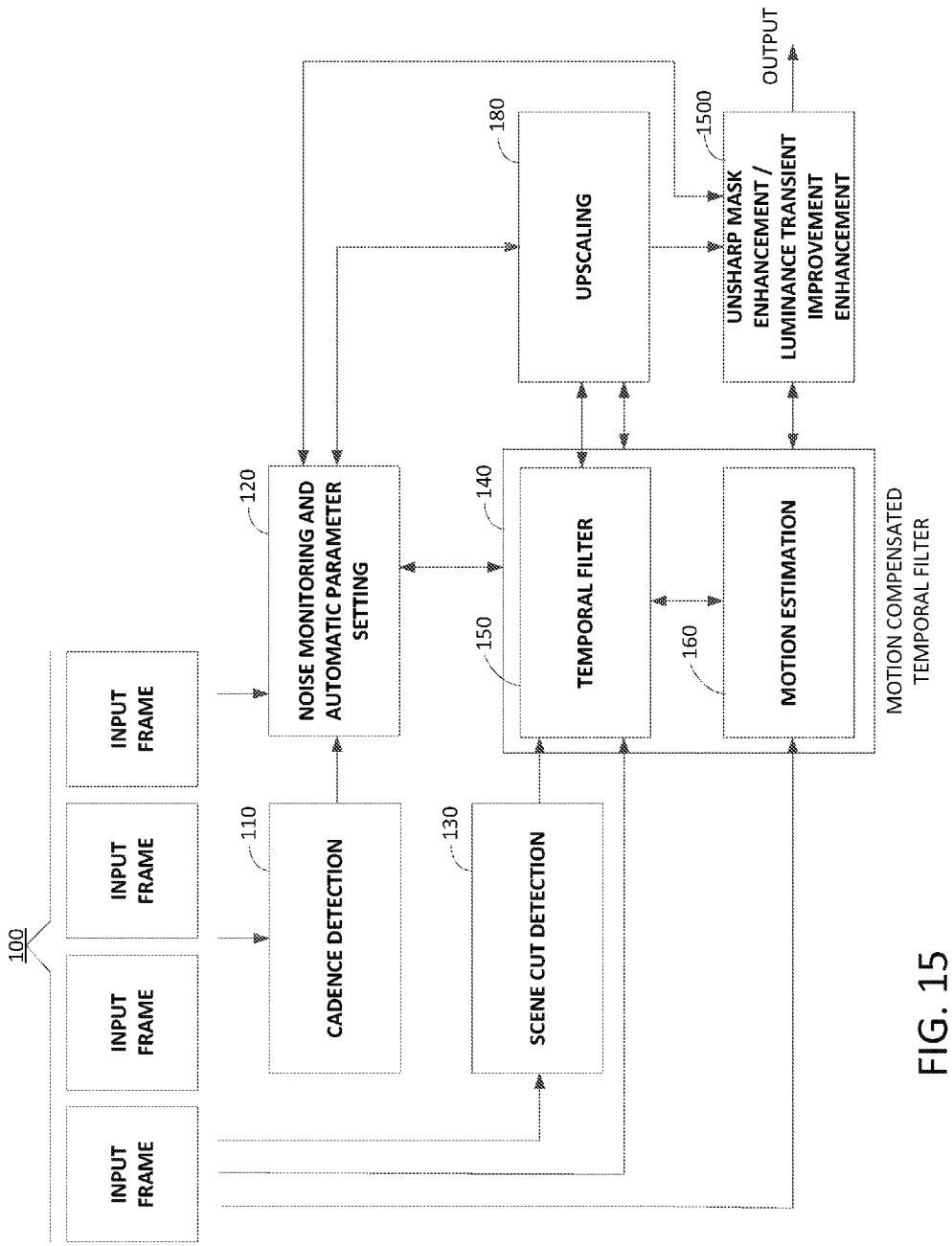
FIG. 15 illustrates another technique to enhance frames of a video.

Referring to FIG. 15, in another embodiment, the spatial noise reduction and enhancement 170 may be removed and replaced with an unsharp mask enhancement and/or luminance transient improvement enhancement 1500 technique.

Figure 16:
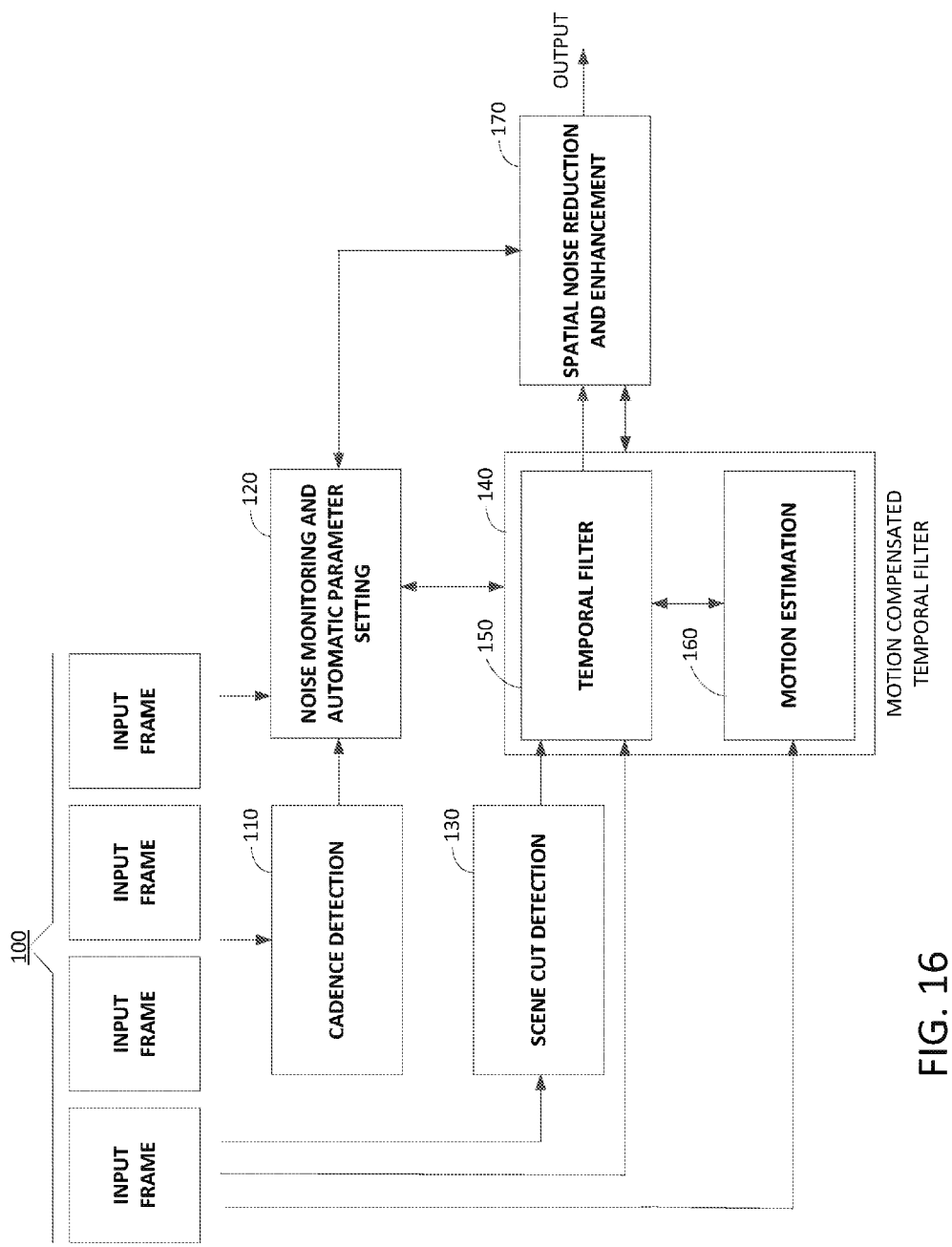
FIG. 16 illustrates another technique to enhance frames of a video.

Referring to FIG. 16, a variation of the enhancement system may be used when the input and the output resolution are the same, such as a 4K input and a 4K output. With the input and output resolutions being the same, the upscaling process may be removed.

Figure 17:
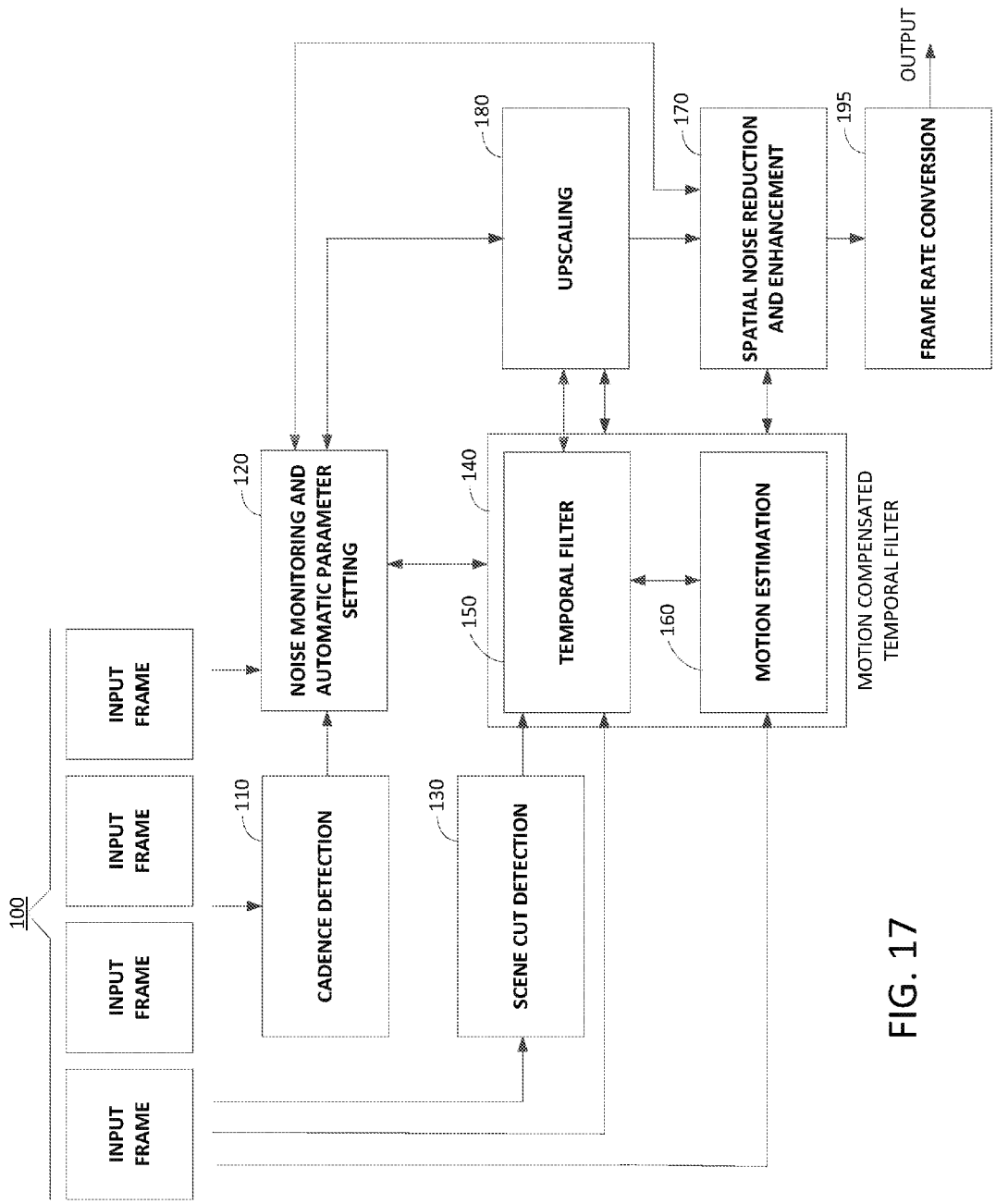
FIG. 17 illustrates another technique to enhance frames of a video.

Referring to FIG. 17, a variation of the enhancement system includes a frame rate conversion 195 which increases the frame rate of the incoming video sequence. The frame rate conversion 195 may repeat and/or interpolate the enhanced frames it receives to change the frame rate.

Figure 18:
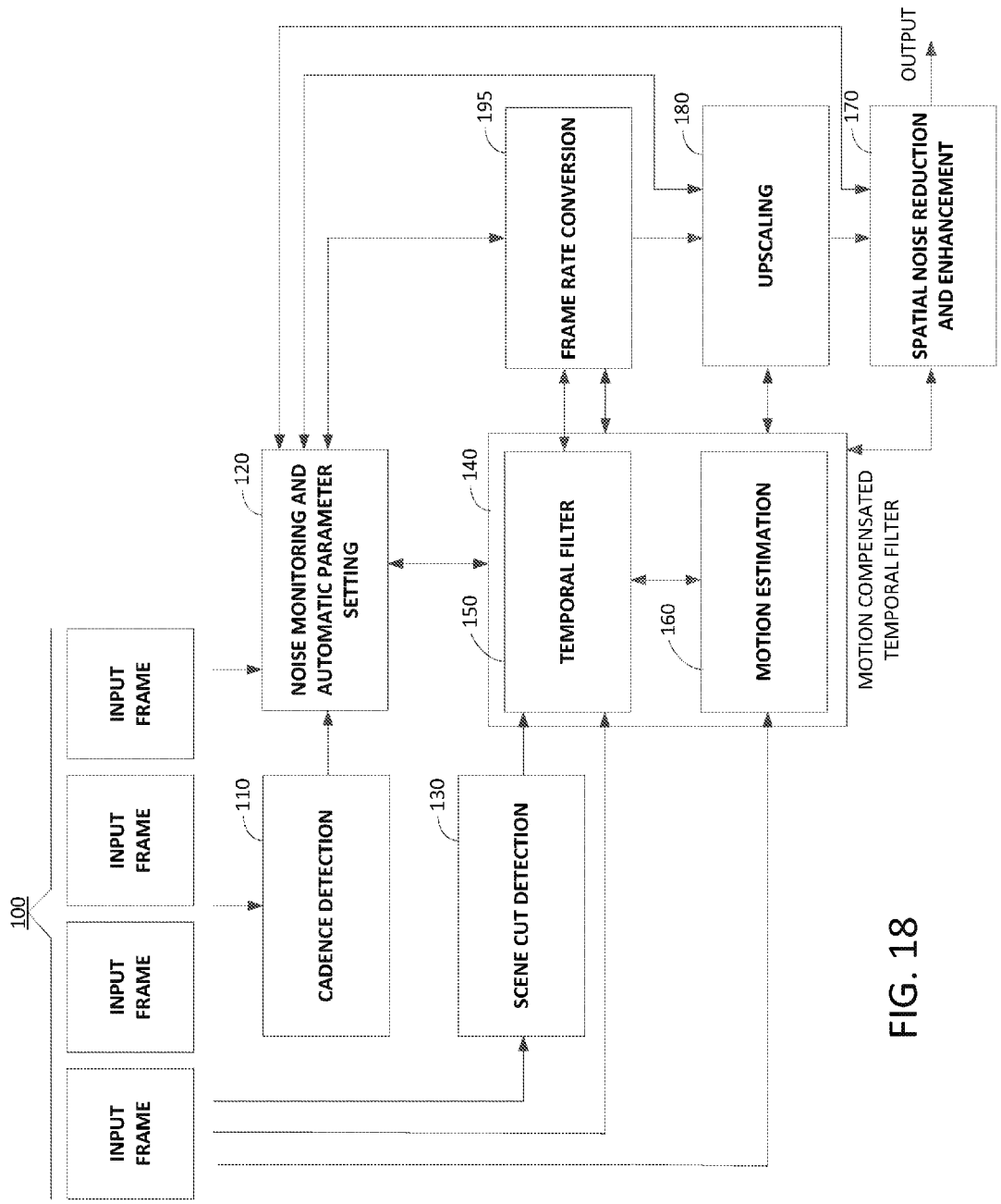
FIG. 18 illustrates another technique to enhance frames of a video.

Referring to FIG. 18, a variation of the enhancement system includes a frame rate conversion 195 which increases the frame rate of the incoming video sequence. The frame rate conversion 195 may repeat and/or interpolate the enhanced frames it receives to change the frame rate. The output of the frame rate conversion 195 is provided to the upscaling 180.

Figure 19:
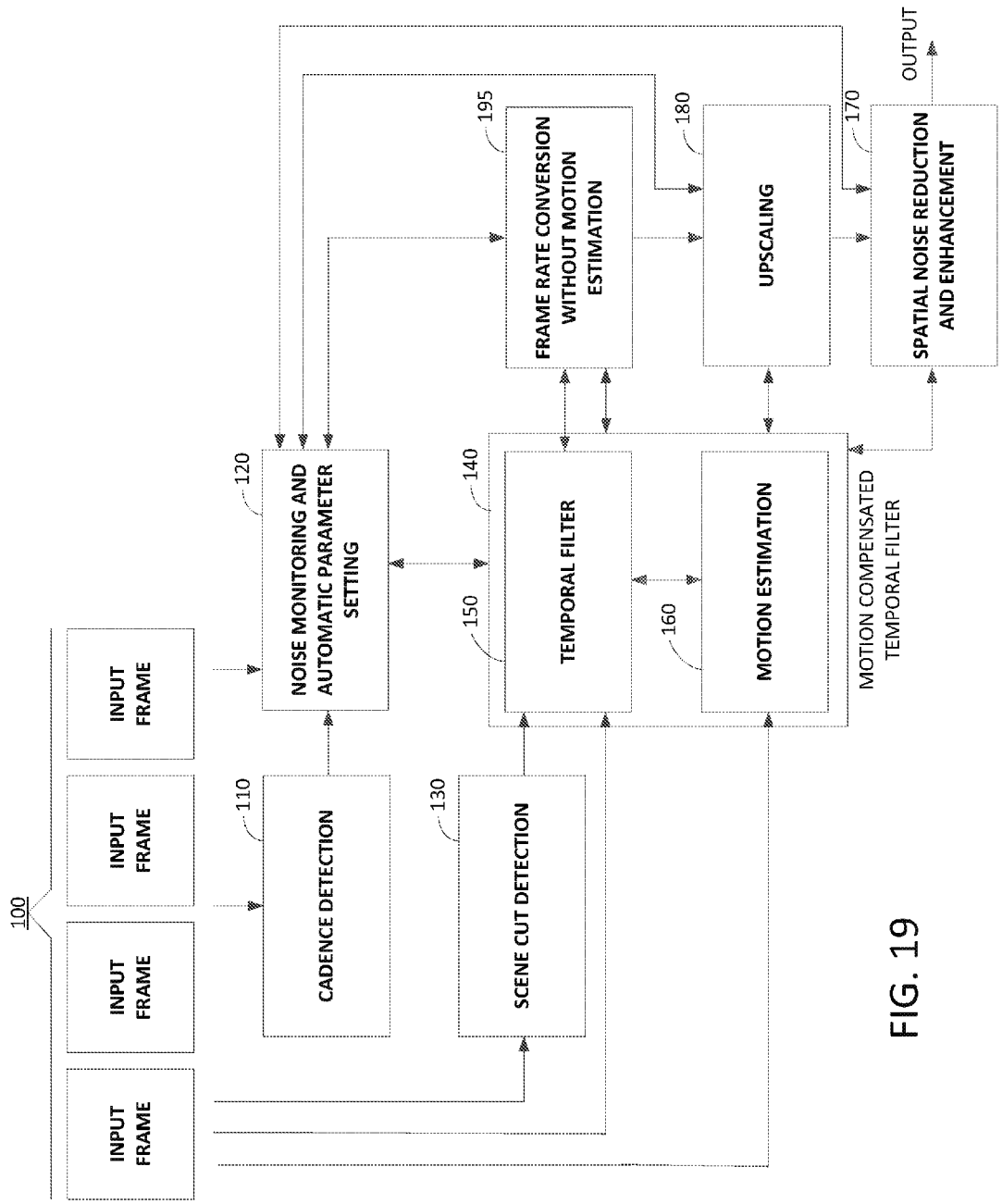
FIG. 19 illustrates another technique to enhance frames of a video.

Referring to FIG. 19, a variation of the enhancement system includes a frame rate conversion 195 which increases the frame rate of the incoming video sequence without the use of motion estimation. The frame rate conversion 195 may repeat and/or interpolate the enhanced frames it receives to change the frame rate. The output of the frame rate conversion 195 is provided to the upscaling 180.

Interpolated frame detection of the interpolated frames typically involves using the error estimation based upon motion compensation, which is computationally intensive. It has been determined that when the noise levels are generally high that the information from a first type of statistical measure, such as a noise level histogram, may be utilized to distinguish between an original frame and an interpolated frame. It has been determined that when the noise levels are generally low that information from a second type of statistical measure, such as a thresholded Laplacian map and a difference map, may be utilized to distinguish between an original frame and an interpolated frame.

Figure 20:
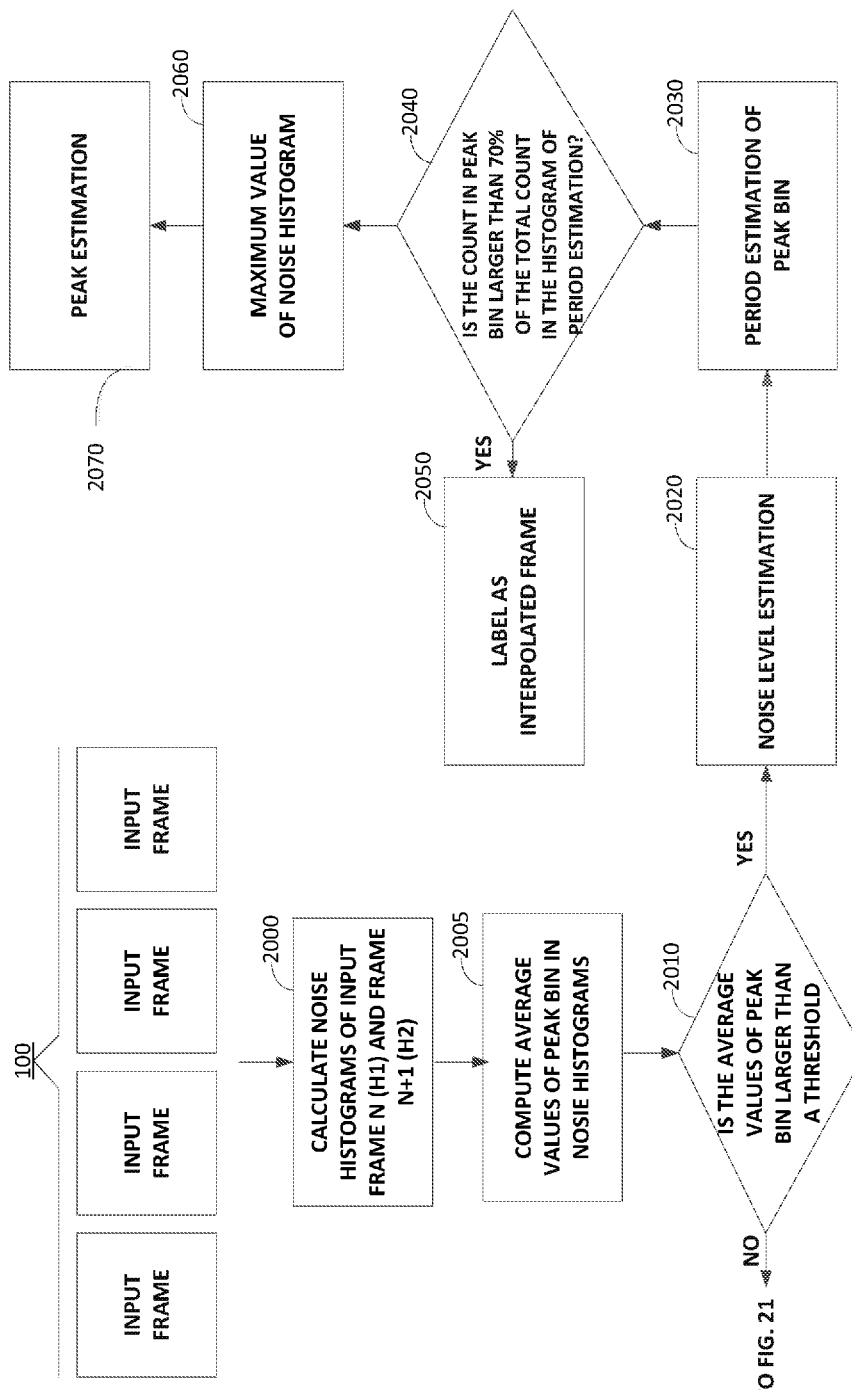
FIG. 20 illustrates an interpolation frame determination technique.

Referring to FIG. 20, one technique is illustrated to perform interpolated frame detection without using motion compensation which is computationally efficient. It has been observed that when the noise levels are generally high the interpolated frames tends to average the random noise in the background while typically preserving lower noise levels compared to the current frame. A noise histogram 2000 may be determined with a noise standard deviation in the horizontal axis for each of a sequence of input frames 100 (such as two sequential frames, namely, Frame N and Frame N+1). The temporal average values of the peak bins in the noise histograms may be computed 2005. The peak bin values 2005 of the noise histograms 2000 for a pair of frames, e.g., Frame N (H1) and Frame N+1 (H2), may be compared 2010 to a threshold. When the average values of the peak bin is smaller than a threshold 2010 it tends to indicate that the frame may be determined to be an interpolated frame as determined by a blur estimation process (FIG. 21) and period estimation process (FIG. 22) described later.

When the average values of the peak bin are greater than a threshold 2010, it indicates the noise level is high. Thus, noise level estimation 2020 is applied and the period estimation is conducted 2030. If the count in peak bin is larger than 70% of the total count in the histogram of period estimation 2040, it means for one frame with much lower peak bin has much smaller standard deviation of the noise for most of pixels in that image. Thus the one with smaller peak bin of noise histogram is determined to be the interpolated frame 2050. If not greater than 70% then a maximum value of the noise histogram is determined 2060 and the period is estimated 2070.

In another modified embodiment, after computing the average of peak bin in the noise histogram, the system may determine whether the noise level of the sequence is relatively high or relatively low using any technique. If the noise level is relatively low it is desirable to further perform a blur estimation.

Figure 21:
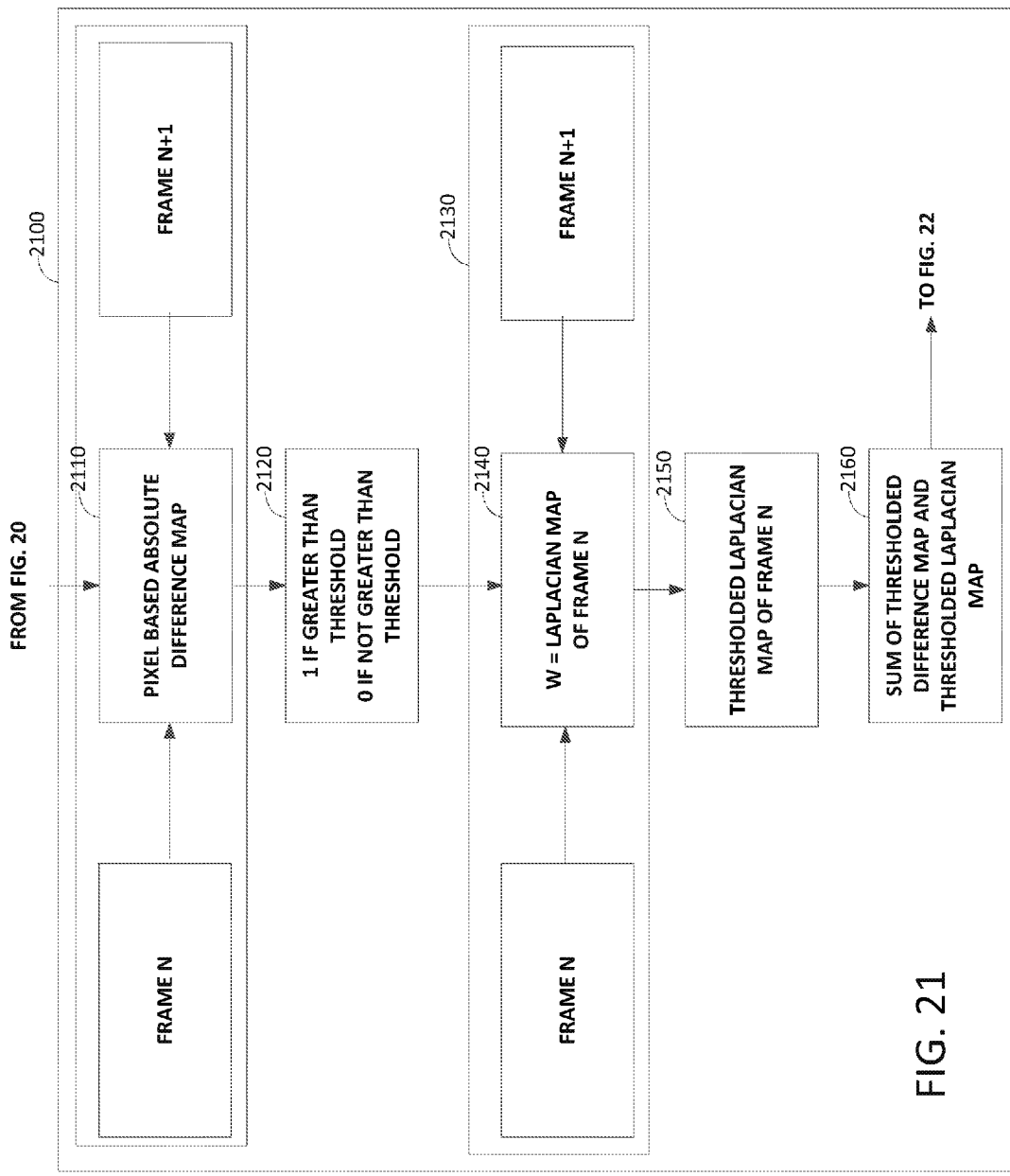
FIG. 21 illustrates additional interpolation frame determination technique.

Referring to FIG. 21, the interpolation frame detection may include a blur estimation process 2100. The bur estimation process 2100 may include computing a pixel based absolute difference map 2110 (T=abs(pixel differences)) based upon Frame K−1 and Frame K. The resulting difference map 2120 tends to filter out those pixels that are generally static in nature and assigns them a value of 0 (e.g., background image details). In addition to the blur estimation process 2100 the interpolation frame detection may also include a thresholded Laplacian map 2130. The thresholded Laplacian map 2130 may be computed by determining a Laplacian map of Frame N 2140. The Laplacian of each pixel, referred to as W, may be calculated by using a 3×3 Laplacian operator, e.g., [0 −1 0; −1 4 −1; 0 −1 0] 2140. A thresholded Laplacian map of frame N may be determined based upon an adaptive threshold that may be determined as a minimum of (M1, M2)*0.2, where M1 may be determined as the maximum value of the Laplacian map for the Frame N and M2 may be determined as the maximum value of the Laplacian map for the Frame N+1. This adaptive threshold is compared against W, where if W is greater than the threshold the pixel is assigned a value of 0 and if W is not greater than the threshold the pixel is assigned a value of 1. The pixels both having a value of 1 of the thresholded Laplacian map of frame N 2150 and thresholded difference map 2120 are determined 2160. The estimation of the blur may be the sum of the number of pixels from the thresholded Laplacian map 2150 and the thresholded difference map 2120, and more preferably those pixels that both have a value of 1. The blurred frames tend to have a different distribution compared to the new frame N+1.

Figure 22:
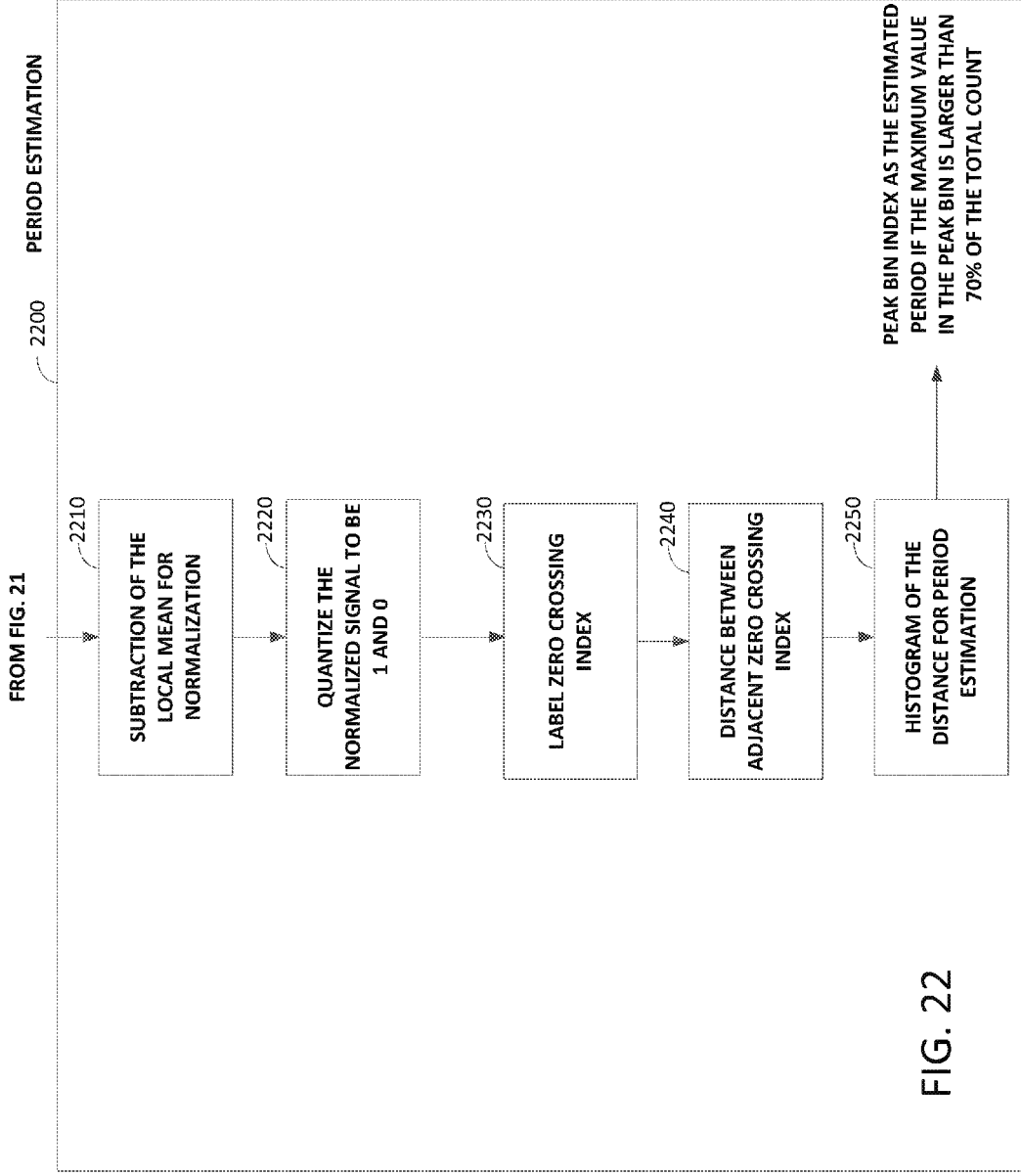
FIG. 22 illustrates additional interpolation frame determination technique.

Referring to FIG. 22, the pixel counts satisfying the aforementioned conditions may be used as the basis for a period estimation 2200. The period estimation 2200 may be based upon a subtraction of a local mean of the respective frame 2210 for normalization. The normalization adjusts the values so that each of the frames are more comparable with one another. The normalized frames may be quantized 2220 to either 1 or 0 based upon a threshold. In this manner, values being sufficiently large are set to 1 and those that are not sufficiently large are set to 0. In addition, quantizing the values increases the computational efficiency of the system. The quantized frames may be temporally processed to determine zero crossings 2230 of the respective pixels in the series of frames. The distance between adjacent zero crossings 2340 may be determined for the respective pixels which tends to indicate period of the sequence of frames. A histogram of the distance 2350 may be determined for the period estimation to determine the primary period. The peak bin index may be used as the estimated period 2360 if the maximum value in the peak bin is larger than 70 percent of the total count of the histogram. This comparison discriminates between those cases that a strong likelihood that the period has been detected and those cases where it is unlikely that a period has been detected or exists.

Figure 23:
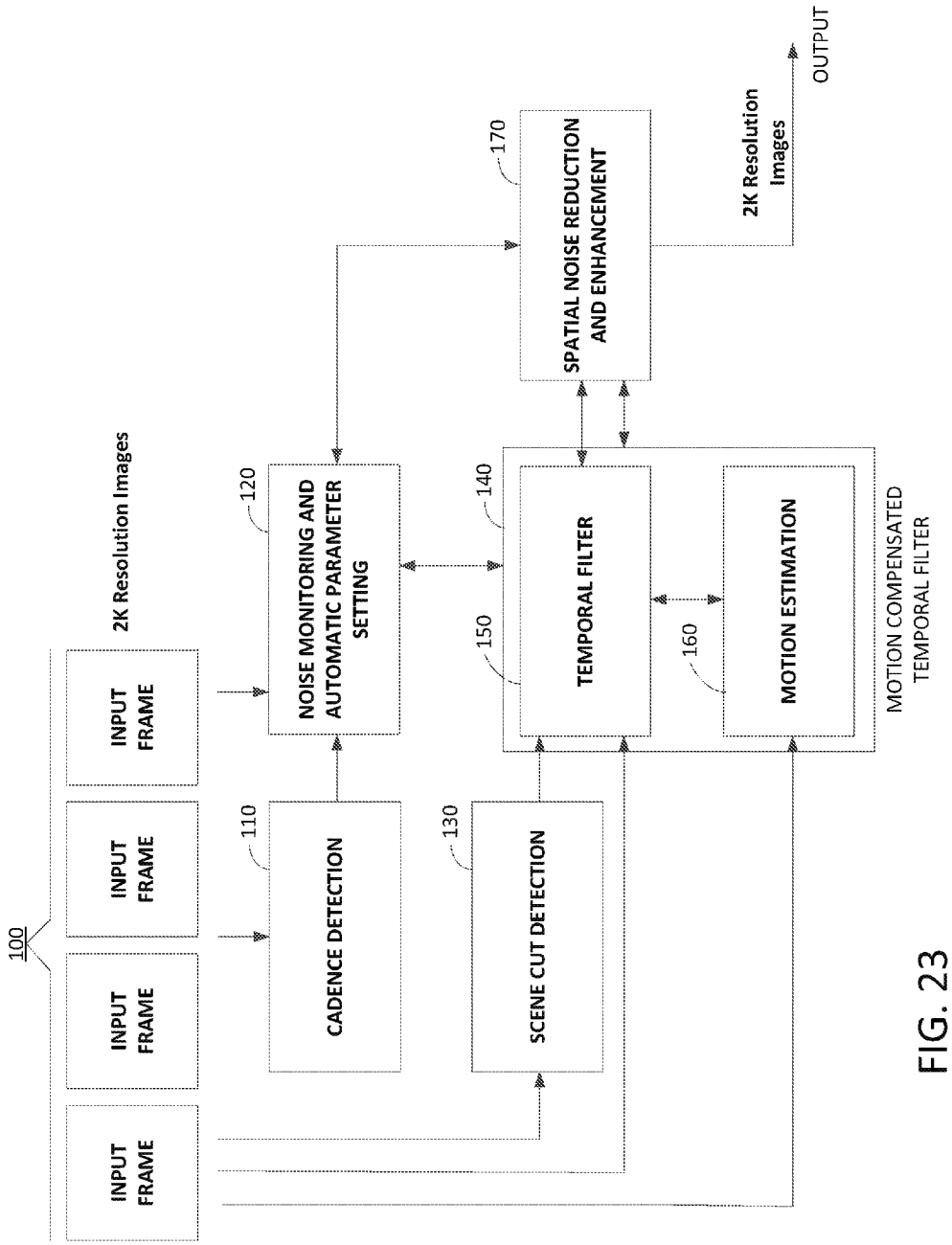
FIG. 23 illustrates another technique to enhance frames of a video.

Referring to FIG. 23, another embodiment is illustrated. The input frames may each have the same input resolution, such as 2K resolution images. The different image processing techniques may likewise each operate on 2K resolution frames so that no change of resolution occurs in the processing. In this manner, the output resolution of the spatial noise reduction and enhancement, such as 2K resolution frames, is the same as the resolution of the input frames.

Figure 24:
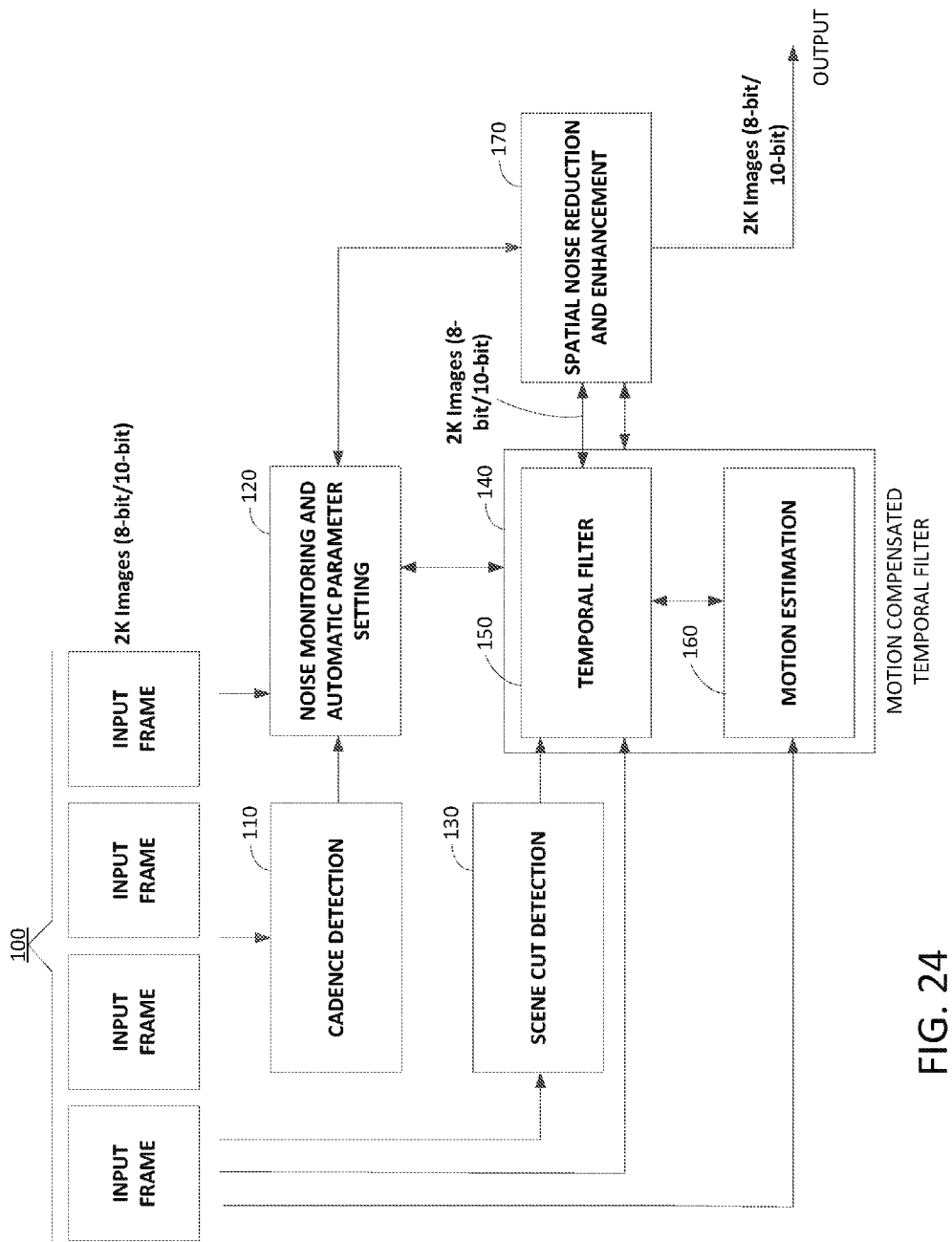
FIG. 24 illustrates another technique to enhance frames of a video.
Figure 25:
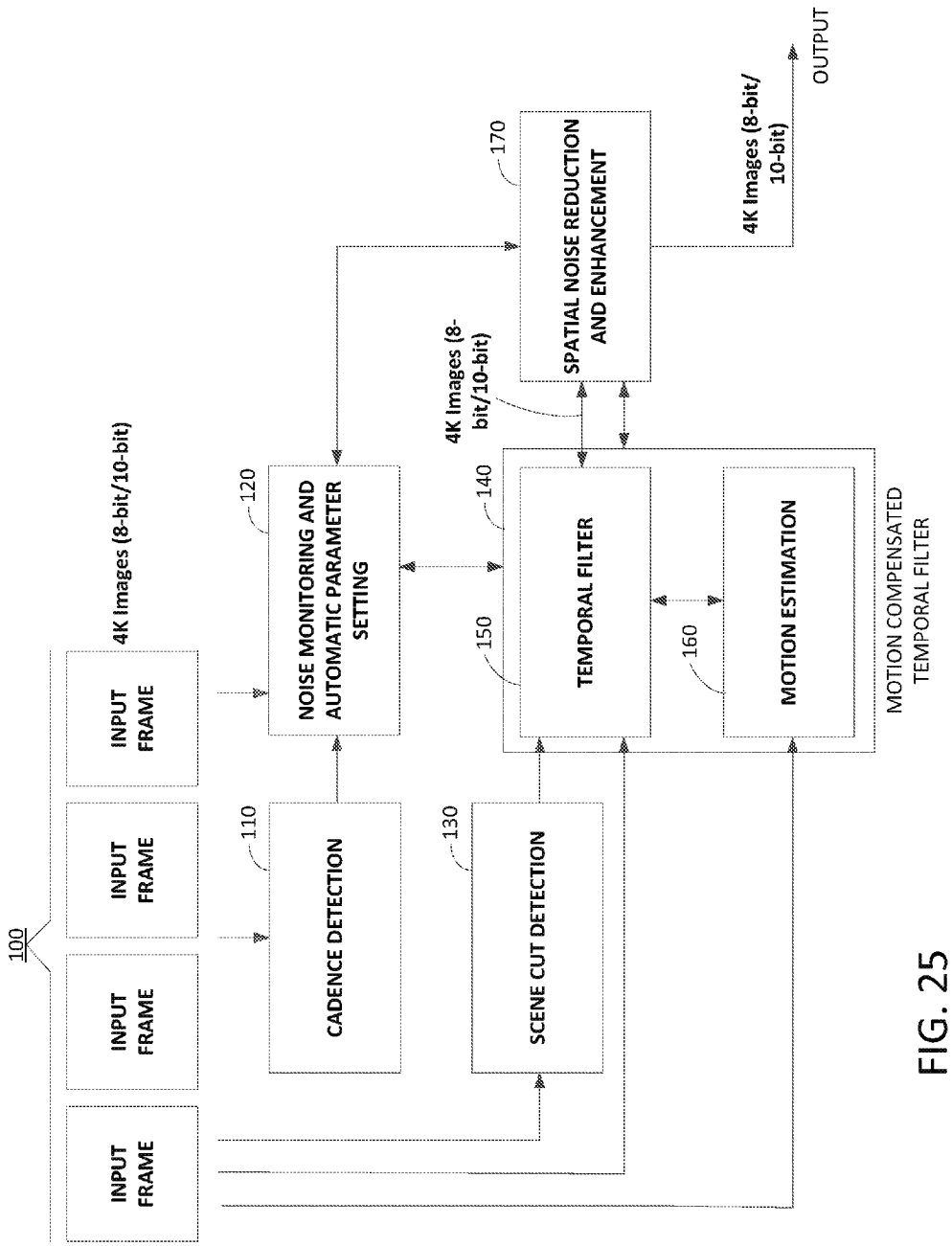
FIG. 25 illustrates another technique to enhance frames of a video.

Different image resolutions may be more readily accommodated by the modification of the bit depth of the processing. For example referring to FIG. 24, 8-bit RGB data is suitable for a 2K image resolution. For example referring to FIG. 25, 10-bit RGB data is suitable for a 4K image resolution and may likewise be used for 2K image resolution. Any suitable bit depth may likewise be used, as desired.

As previously described, it is desirable to process a single channel of the data rather than three (namely, one for each of the color channels), which is preferably the luma channel. Unfortunately, using only the luminance channel tends to result in some undesirable noise that is preferably reduced.

Figure 26:
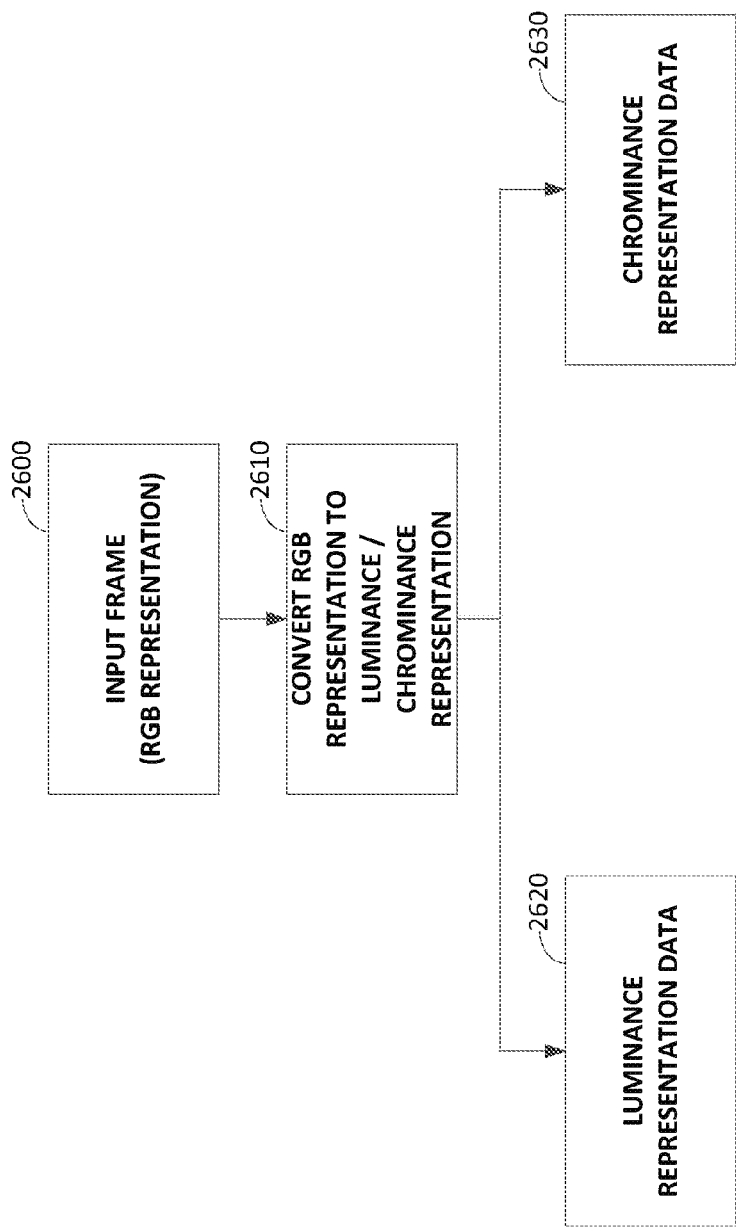
FIG. 26 illustrates luminance and chrominance separation for the frame enhancement.

Referring to FIG. 26, it may be desirable to covert the input frame 2600 from its RGB representation (or other color representation) for each pixel to a different representation that includes a luminance and/or a chrominance representation 2610. The luminance representation data 2620 may be separated from the chrominance representation data 2630 for each channel of the input frame. The luminance representation data 2620 may be processed by the system, such as that illustrated in FIG. 23, to provide the output as a luminance output. The output which is based upon the luminance presentation data 2620 may be recombined with the chrominance representation data 2630, converted back to the original color space, such as the RGB color space, to provide an improved image. The luminance conversion and processing may be based upon a single channel or multiple channels, as desired.

There are several different techniques that may be used to convert a first color space, such as RGB, to a color space that generally isolates the luminance information, and includes two other channels, such as chrominance data. By way of example, some of these techniques includes YCbCr (luma component and blue-difference and red-difference chroma components), YUV (luma component and two chrominance components), HSV (hue, saturation, and value components), XYZ (x is mix of cone response curves chosen to be non-negative, y is luminance, and z is a cone response), xyL (e.g., xyY) and YIQ (luma information, and chrominance information).

By the nature of YCbCr, it tends to result in significant noise in the processed output, even though the noise is not apparent in the luminance (Y) data. This implies that noise exists in the Cb and Cr channels. In addition, the typical YCbCr conversion process compresses the luma channel to the range of 16-235, and the Cb,Cr channels to the range of 16-240. Thus, a portion of the information may be lost in the conversion process.

By the nature of XYZ, it tends to result in less significant noise in the processed output, while a variant of xyL tended to result in even less significant noise in the processed output. The conversion from RGB to XYZ is a non-linear process that includes a gamma correction for all but the lowest values with a linear scaling on the luminance (Y) being performed for low values. Unfortunately, there are many places in these color spaces where the permitted Y values are highly restricted. These restrictions tend to be in the dark regions where a small change in luminance translates into a substantially different RGB color.

By the nature of YIQ, it tends to have even less significant noise in the processed output. The noise tends to be similar to xyL in the ability to attenuate the noise, but without the limitation of illegal values of L when converting back to RGB.

The identification of the frames that include determination of whether compression was used has a tendency to include false positives, which can result in degraded output image quality. It is theorized that the false positives are the result, at least in part, due to strong alignment of textual edges. In general, a histogram based compression identification technique detects block boundaries, where the blocks are used in the compression process. If the variance of the gradients is larger on particular bit boundaries than what is statistically probable, it is likely due to a block boundary. However, in both compressed and uncompressed images, there will tend to be no significant gradients in smooth areas. Accordingly, smooth areas are not very useful in the detection of block boundaries. However, if such smooth areas are included in the detection process they add to the number of samples, thus reducing the variance. With a sufficient number of such samples (e.g., 0), a small difference will tend to appear to be significant. As a result, while calculating block boundaries to detect compression it is desirable to exclude such samples (e.g., 0).

The above described pre-processing can be performed for both compression detection in the horizontal direction (while accounting for gradients in the vertical direction) as well as compression detection in the vertical direction (while accounting for gradients in the horizontal direction). This facilitates the block boundary calculation during compression detection.

The identification of the frames that include determination of whether compression was used has a tendency to include false negatives, which can result in degraded output image quality. The result of such a failure to identify a compressed frame results in the system reverting to lower additive noise values. Similarly, a determination of whether compression was used has a tendency to include false positives, thus identifying uncompressed frames as compressed frames, resulting an overly smoothing some frames. This misidentification in the nature of whether the frames are compressed may be reduced by including the compression detection to make the same identification for a plurality of frames in a row.

In some cases, the temporal filter tends to introduce ghosting artifacts, that is, a portion of the previous frame may be observed in the current frame. This may be generally described as a moving object leaving an observable "trail". The source of this ghosting is that the calculation of the weights does not necessarily detect when it was inappropriate to average the prior frame with the current frame. This tends to occur more frequently when a boundary is crossed, and although the variance on both sides may be similar, the intensities may be quite different. To reduce the ghosting effects, two additional parameters may be included, namely, a threshold and a scale. If the mean difference between the prior processed frame and the current frame is less than the threshold the weights may be calculated using a default technique. If the mean difference between the prior processed frame and the current frame is greater than the threshold the weight may be shifted, such as being shifted toward the current frame in a proportional amount of the difference and inversely with the magnitude of the scale.

By way of example, the threshold may have a default of 4 and the scale may have a default of 4. In this case, 4 is the difference in mean luminance in a 3×3 square, where the luminance is in a range of 0 to 255. These values will cause the gain (weight given to the current frame) to be increased once the mean difference is greater than 4. Once the mean difference reaches 8 the gain will be half way to the maximum, and once it reaches 12 it will be 75% of the way to the maximum, and so forth. An exemplary table is illustrated in FIG. 27. The technique may be such that it only approaches but never reaches providing the current frame with a maximum gain. Alternatively, the table may include an upper threshold value instead of a scale, and the gain may be linearly scaled to the maximum value at the upper threshold. It is to be understood that any other values may be used in the table, as desired, in addition to using a function or otherwise instead of a table.

The terms and expressions which have been employed in the foregoing specification are used in as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for enhancing an image at a resolution having a width w and a height h, by reducing the artifacts in the image, comprising:
   (a) a cadence detection process detecting a cadence of a series of frames and providing a cadence signal;
   (b) a scene cut detection process detecting a scene cut of said series of frames and providing a scene cut signal;
   (c) a noise monitoring process detecting noise in said series of frames based upon said cadence signal from said cadence detection process and providing a noise monitoring signal;
   (d) a temporal filtering process temporally filtering said series of frames wherein said temporal filtering is modified based upon said scene cut signal from said scene cut detection process and said noise monitoring signal from said noise monitoring process, and providing a modified temporal filtering signal;
   (e) a spatial noise reduction process reducing spatial noise in said series of frames wherein said reducing spatial noise is modified based upon said modified temporal filtering signal from said modified temporally filtered frames and said noise monitoring signal from said noise monitoring process;
   (f) wherein said cadence detection process processing said series of frames at said resolution of having said width x and said height h, said scene cut detection process processing said series of frames at said resolution of having said width x and said height h, said noise monitoring process processing said series of frames at said resolution of having said width x and said height h, said temporal filtering process processing said series of frames at said resolution of having said width x and said height h, and said spatial noise reduction process processing said series of frames at said resolution of having said width x and said height h to reduce the artifacts in the image, thereby providing said enhanced image;
   wherein the method is performed by an enhancement system.

2. A method for enhancing an image comprising:
(a) a cadence detection process detecting a cadence of a series of frames;
(b) a scene cut detection process detecting a scene cut of said series of frames;
(c) a noise monitoring process detecting noise in said series of frames based upon said cadence detection process;
(d) a temporal filtering process temporally filtering said series of frames wherein said temporal filtering is modified based upon said scene cut detection process and said noise monitoring process;
(e) a spatial noise reduction process reducing spatial noise in said series of frames wherein said reducing spatial noise is modified based upon said modified temporally filtered frames and said noise monitoring process;
(f) wherein said cadence detection process, said scene cut detection process, said noise monitoring process, said temporal filtering process, and said spatial noise reduction process each processing said series of frames at the same resolution, wherein said same resolution is 2K;
wherein the method is performed by an enhancement system.

3. A method for enhancing an image comprising:
(a) a cadence detection process detecting a cadence of a series of frames;
(b) a scene cut detection process detecting a scene cut of said series of frames;
(c) a noise monitoring process detecting noise in said series of frames based upon said cadence detection process;
(d) a temporal filtering process temporally filtering said series of frames wherein said temporal filtering is modified based upon said scene cut detection process and said noise monitoring process;
(e) a spatial noise reduction process reducing spatial noise in said series of frames wherein said reducing spatial noise is modified based upon said modified temporally filtered frames and said noise monitoring process;
(f) wherein said cadence detection process, said scene cut detection process, said noise monitoring process, said temporal filtering process, and said spatial noise reduction process each processing said series of frames at the same resolution, wherein said same resolution is 4K;
wherein the method is performed by an enhancement system.

4. A method for enhancing an image by reducing the artifacts in the image, comprising:
(a) a cadence detection process detecting a cadence of a series of frames and providing a cadence signal;
(b) a scene cut detection process detecting a scene cut of said series of frames and providing a scene cut signal;
(c) a noise monitoring process detecting noise in said series of frames based upon said cadence signal from said cadence detection process and providing a noise monitoring signal;
(d) a temporal filtering process temporally filtering said series of frames wherein said temporal filtering is modified based upon said scene cut signal from said scene cut detection process and said noise monitoring signal from said noise monitoring process, and providing a modified temporal filtering signal;
(e) a spatial noise reduction process reducing spatial noise in said series of frames wherein said reducing spatial noise is modified based upon said modified temporal filtering signal from said modified temporally filtered frames and said noise monitoring signal from said noise monitoring process and providing a spatial noise reduction signal;
(f) wherein at least one of (i) said cadence detection process is based upon a luminance channel processing, (ii) said scene cut detection process is based upon said luminance channel processing, (iii) said noise monitoring process is based upon said luminance channel processing, (iv) said temporal filtering process is based upon said luminance channel processing, and (v) said spatial noise reduction process is based upon said luminance channel processing, and said spatial noise reduction signal of said spatial noise reduction process incorporates modifying said spatial noise reduction signal with chrominance data from a respective one of said series of frames to reduce the artifacts in the image, thereby providing said enhanced image;
wherein the method is performed by an enhancement system.

5. The method of claim 4 wherein said spatial noise reduction process incorporates said modifying said spatial noise reduction signal with said chrominance data from said respective ones of said series of frames.

6. The method of claim 5 further comprising converting said series of frames from a first color representation to a second color representation that includes said luminance channel and said chrominance data.

7. The method of claim 6 wherein said converting is based upon a XYZ technique.

8. The method of claim 6 wherein said converting is based upon a xyL technique.

9. The method of claim 6 wherein said converting is based upon a YIQ technique.

10. A method for enhancing an image by reducing the artifacts in the image, comprising:
(a) a cadence detection process detecting a cadence of a series of frames and providing a cadence signal;
(b) a scene cut detection process detecting a scene cut of said series of frames and providing a scene cut signal;
(c) a noise monitoring process detecting noise in said series of frames based upon said cadence signal from said cadence detection process and providing a noise monitoring signal;
(d) a temporal filtering process temporally filtering said series of frames wherein said temporal filtering is modified based upon said scene cut signal from said scene cut detection process and said noise monitoring signal from said noise monitoring process, and providing a modified temporal filtering signal;
(e) a spatial noise reduction process reducing spatial noise in said series of frames wherein said reducing spatial noise is modified based upon said modified temporal filtering signal from said modified temporally filtered frames and said noise monitoring signal from said noise monitoring process and providing a spatial noise reduction signal;
(f) said noise monitoring signal from said noise monitoring process is further modified based upon a compression detection process;
(g) said compression detection process modifying its process based upon a determination whether of a region of a respective one of said frames is smooth to reduce the artifacts in the image, thereby providing said enhanced image;
wherein the method is performed by an enhancement system.

11. The method of claim 10 wherein said determination of whether said region of said respective one of said frames is said smooth is based upon a gradient of 0.

12. The method of claim 10 wherein said determination is in a horizontal direction while accounting for a vertical direction is in a different manner.

13. The method of claim 10 wherein said determination is in a vertical direction while accounting for a horizontal direction is in a different manner.

14. The method of claim 12 wherein said determination is in said vertical direction while accounting for said horizontal direction is in a different manner.

15. A method for enhancing an image by reducing the artifacts in the image, comprising:
   (a) a cadence detection process detecting a cadence of a series of frames and providing a cadence signal;
   (b) a scene cut detection process detecting a scene cut of said series of frames and providing a scene cut signal;
   (c) a noise monitoring process detecting noise in said series of frames based upon said cadence signal from said cadence detection process and providing a noise monitoring signal;
   (d) a temporal filtering process temporally filtering said series of frames wherein said temporal filtering is modified based upon said scene cut signal from said scene cut detection process and said noise monitoring signal from said noise monitoring process, and providing a modified temporal filtering signal;
   (e) a spatial noise reduction process reducing spatial noise in said series of frames wherein said reducing spatial noise is modified based upon said modified temporal filtering signal from said modified temporally filtered frames and said noise monitoring signal from said noise monitoring process and providing a spatial noise reduction signal;
   (f) said noise monitoring signal from said noise monitoring process is further modified based upon a compression detection process;
   (g) said compression detection process modifying its process based upon previous frames identification of compression detection process to reduce the artifacts in the image, thereby providing said enhanced image;
   wherein the method is performed by an enhancement system.

16. The method of claim 15 wherein said identification is a predetermined number of frames.

17. A method for enhancing an image by reducing the artifacts in the image, comprising:
   (a) a cadence detection process detecting a cadence of a series of frames and providing a cadence signal;
   (b) a scene cut detection process detecting a scene cut of said series of frames and providing a scene cut signal;
   (c) a noise monitoring process detecting noise in said series of frames based upon said cadence signal from said cadence detection process and providing a noise monitoring signal;
   (d) a temporal filtering process temporally filtering said series of frames wherein said temporal filtering is modified based upon at least one of said scene cut signal from said scene cut detection process and said noise monitoring signal from said noise monitoring process, and providing a modified temporal filtering signal;
   (e) a spatial noise reduction process reducing spatial noise in said series of frames wherein said reducing spatial noise is modified based upon at least one of said modified temporal filtering signal from said modified temporally filtered frames and said noise monitoring signal from said noise monitoring process and providing a spatial noise reduction signal;
   (f) wherein at least one of:
      (i) said cadence detection process processing said series of frames at a resolution of having a width x and a height h, said scene cut detection process processing said series of frames at said resolution of having said width x and said height h, said noise monitoring process processing said series of frames at said resolution of having said width x and said height h, said temporal filtering process processing said series of frames at said resolution of having said width x and said height h, and said spatial noise reduction process processing said series of frames at said resolution of having said width x and said height h to reduce the artifacts in the image, thereby providing said enhanced image, and
      (ii) at least one of (i) said cadence detection process is based upon a luminance channel processing, (ii) said scene cut detection process is based upon a luminance channel processing, (iii) said noise monitoring process is based upon a luminance channel processing, (iv) said temporal filtering process is based upon a luminance channel processing, and (v) said spatial noise reduction process is based upon a luminance channel processing, and said spatial noise reduction signal of said spatial noise reduction process incorporates modifying said spatial noise reduction signal with chrominance data from a respective one of said series of frames to reduce the artifacts in the image, thereby providing said enhanced image;
   wherein the method is performed by an enhancement system.

18. The method of claim 17 including said cadence detection process, said scene cut detection process, said noise monitoring process, said temporal filtering process, and said spatial noise reduction process each said processing said series of frames at same resolution.

19. The method of claim 17 including said at least one of said cadence detection process, said scene cut detection process, said noise monitoring process, said temporal filtering process, and said spatial noise reduction process is based upon said luminance channel processing and said output of said spatial noise reduction process incorporates modifying its output with chrominance data from said respective one of said series of frames.

20. The method of claim 17 wherein said spatial noise reduction process incorporates said modifying its output with said chrominance data from said respective ones of said series of frames.

21. The method of claim 17 further comprising converting said series of frames from a first color representation to a second color representation that includes said luminance channel and said chrominance data.

22. The method of claim 17 further comprising said noise monitoring process further includes a compression detection process that modifies its process based upon a determination whether of a region of a respective one of said frames is smooth.

* * * * *